United States Patent [19]

Shimoda et al.

[11] Patent Number: 5,529,854
[45] Date of Patent: Jun. 25, 1996

[54] MAGNETO-OPTIC RECORDING SYSTEMS

[75] Inventors: Tatsuya Shimoda; Satoshi Shimokawato; Shin Funada; Mamoru Sugimoto; Akira Aoyama; Satoshi Nebashi, all of Nagano-ken, Japan

[73] Assignee: Seiko Epson Corporation, Tokyo, Japan

[21] Appl. No.: 231,866

[22] Filed: Apr. 25, 1994

Related U.S. Application Data

[63] Continuation of Ser. No. 20,886, Feb. 19, 1993, abandoned, which is a continuation of Ser. No. 665,920, Mar. 4, 1991, abandoned, which is a continuation of Ser. No. 193,021, May 12, 1988, abandoned, which is a continuation-in-part of Ser. No. 775,069, Sep. 11, 1985, abandoned.

[30] Foreign Application Priority Data

| Sep. 12, 1984 | [JP] | Japan | 59-191201 |
| Sep. 12, 1984 | [JP] | Japan | 59-191202 |
| Sep. 12, 1984 | [JP] | Japan | 59-191203 |
| Sep. 12, 1984 | [JP] | Japan | 59-191204 |
| Sep. 12, 1984 | [JP] | Japan | 59-191205 |
| Sep. 12, 1984 | [JP] | Japan | 59-191206 |
| Sep. 12, 1984 | [JP] | Japan | 59-191207 |
| Sep. 12, 1984 | [JP] | Japan | 59-191208 |
| Sep. 12, 1984 | [JP] | Japan | 59-191209 |
| Sep. 12, 1984 | [JP] | Japan | 59-191210 |
| Sep. 12, 1984 | [JP] | Japan | 59-191211 |
| Sep. 12, 1984 | [JP] | Japan | 59-191212 |
| Sep. 12, 1984 | [JP] | Japan | 59-191213 |
| Sep. 12, 1984 | [JP] | Japan | 59-191214 |
| Sep. 12, 1984 | [JP] | Japan | 59-191215 |
| Sep. 12, 1984 | [JP] | Japan | 59-191216 |
| Oct. 17, 1984 | [JP] | Japan | 59-217922 |
| Jan. 16, 1985 | [JP] | Japan | 60-5380 |
| Jan. 17, 1985 | [JP] | Japan | 60-6163 |

[51] Int. Cl.$^6$ .................... G11B 5/66; G11B 11/00; G11C 13/06; C23C 14/00
[52] U.S. Cl. .................... 428/694 ML; 428/694 SC; 428/694 LE; 428/684 RE; 428/800; 365/122; 369/13; 369/288; 204/192.2
[58] Field of Search .................... 428/694 SC, 2 E, 428/900, 694 ML, 684 RE; 365/122; 369/13, 788; 204/192.2

[56] References Cited

U.S. PATENT DOCUMENTS

| 4,390,660 | 6/1983 | Ohta et al. | 524/721 |
| 4,489,139 | 12/1984 | Ohta et al. | 428/621 |
| 4,496,395 | 1/1985 | Croat | 148/301 |
| 4,544,443 | 10/1985 | Ohta et al. | 216/24 |
| 4,579,777 | 4/1986 | Honguu | 428/336 |
| 4,612,068 | 9/1986 | Tanaka et al. | 148/301 |
| 4,695,514 | 9/1987 | Takahashi et al. | 428/432 |
| 4,710,431 | 12/1987 | Van Engelen et al. | 428/457 |
| 4,814,053 | 3/1989 | Shimokawato | 204/192.15 |

FOREIGN PATENT DOCUMENTS

| 0106948 | 5/1981 | European Pat. Off. . |
| 2069528 | 8/1981 | European Pat. Off. . |
| 0108474 | 5/1984 | European Pat. Off. . |
| 0133758 | 3/1985 | European Pat. Off. . |
| 0165306 | 9/1983 | Japan . |
| 0150519 | 7/1985 | Japan . |
| 0182506 | 8/1985 | Japan . |

OTHER PUBLICATIONS

Shimoda et al., "Properties of NdDy FcLoTi Magnetooptic Medio Made From Cast Alloy Target," J. Magn. Soc. Jpn. vol. 11 (1987) pp. 337–340.

Tanaka et al., "(Tb,Dy)–FeC based magneto-optical disk with some fouth elements," Jpn. J. Appl. Phys. 26 (1987) p. 231.

Lin et al., "Magnetic and Magnetooptic Properties of NdTbFeLo Vertically Magnetized Films".

Gambino, et al., J. Appl'n p. 57(1), Apr. 1985 "Magnet—Optic Properties of Nd–Fe–Co amorphous alloys".

Primary Examiner—Leszek Kiliman
Attorney, Agent, or Firm—Stroock & Stroock & Lavan

[57] ABSTRACT

A magnetic recording film and a magneto-optic recording system utilizing films. The film includes light and heavy rare earth elements and transition metal elements. The system can include dielectric layers and low magnetic coercivity layers in addition to the recording layer.

18 Claims, 13 Drawing Sheets

FIG. 10 (a)
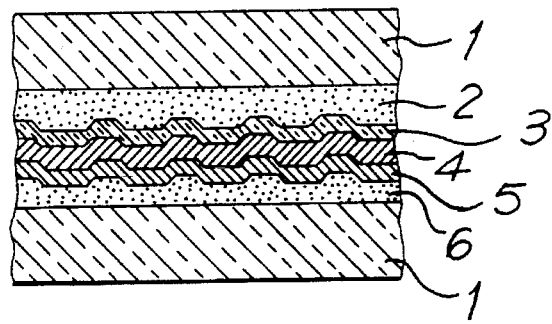
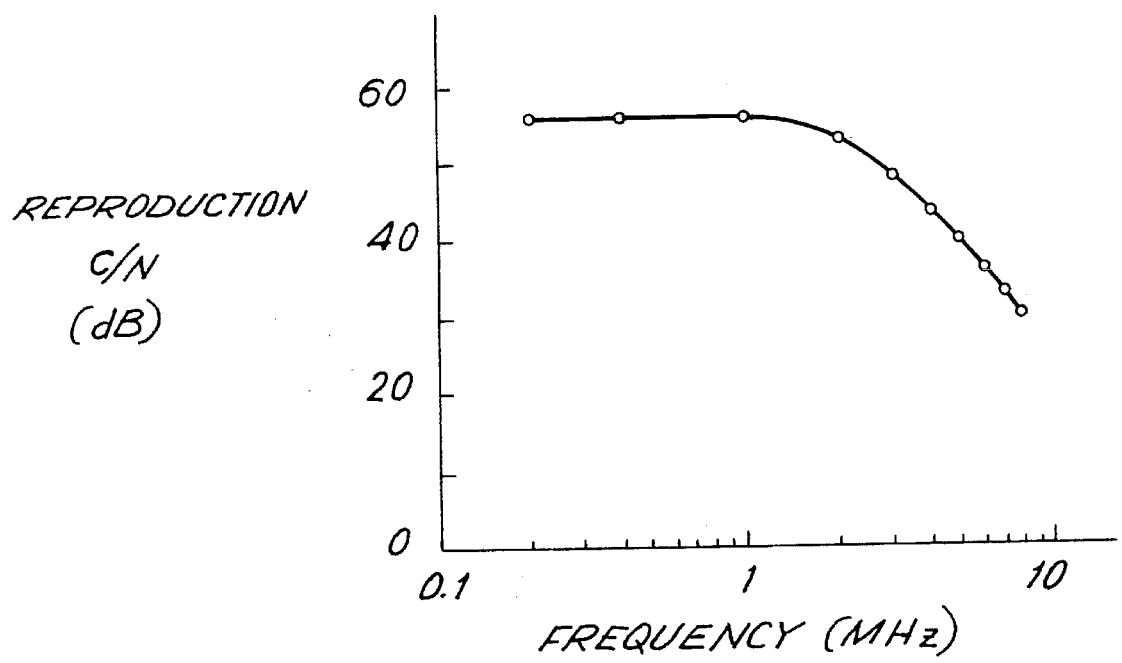
FIG. 10 (b)

○ $(Nd_{1-x}Dy_x)$ 0.25 Fe 0.75
△ $(Nd_{1-x}Dy_x)$ 0.15 Fe 0.85

○ $(Nd_x Dy_{1-x})$ 0.25 Fe 0.75
△ $(Nd_x Gd_{1-x})$ 0.25 Fe 0.75
× $(Nd_x Tb_{1-x})$ 0.25 Fe 0.75

○ $(Nd_{0.6} Tb_{0.4})_{0.25} (Fe_{0.9-y} Co_y Ni_{0.1})_{0.75}$

× Sm
△ Pr
○ Ce $\theta_k$ $[\{Nd_{1-x} LR_x\}_{0.6} Dy_{0.4}]_{0.25} Fe_{0.75}$
LR = Sm, Pr, Ce

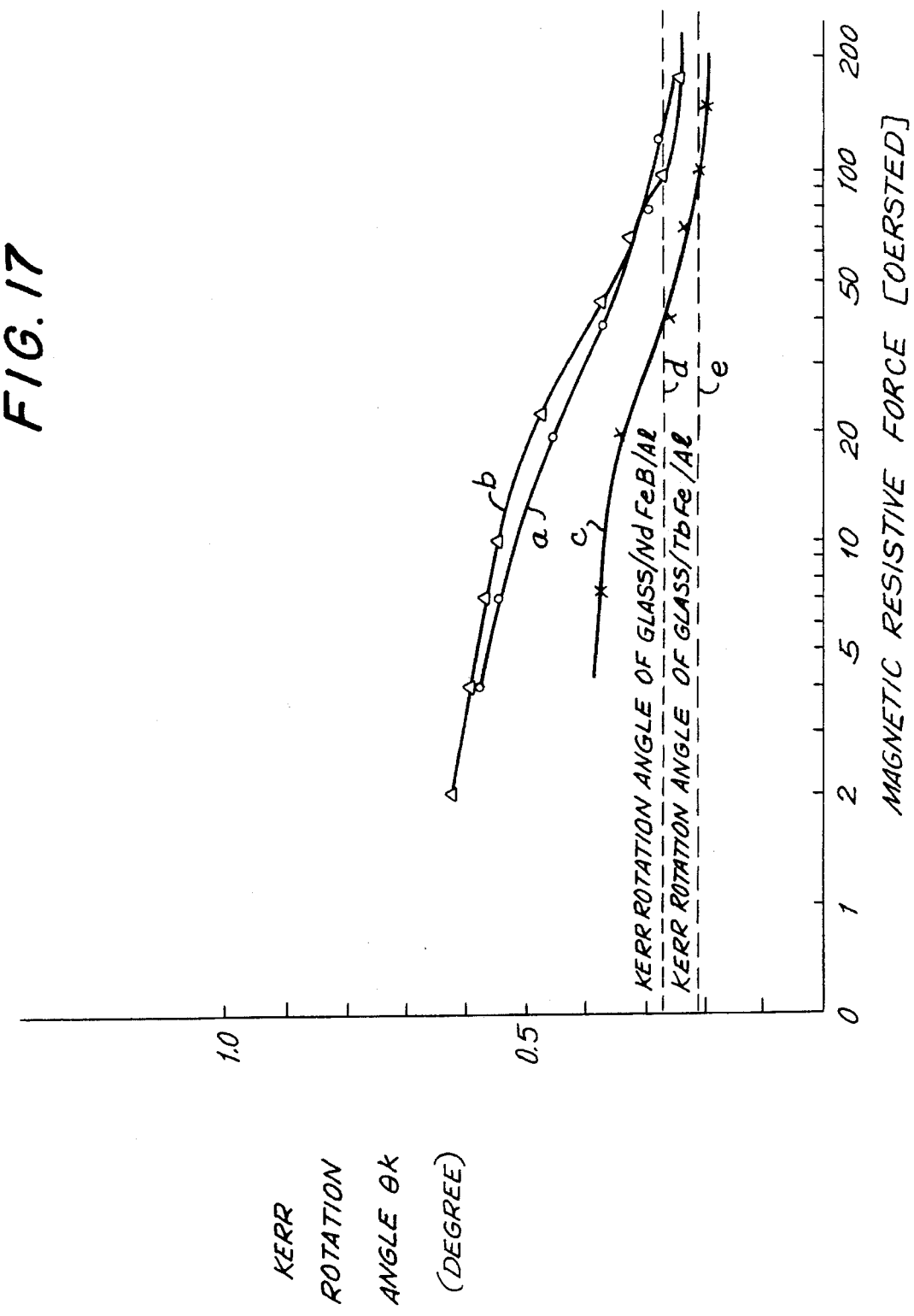

MAGNETO-OPTIC RECORDING SYSTEMS

CROSS-REFERENCE TO RELATED APPLICATIONS

This is a continuation of application Ser. No. 08/020,886, filed Feb. 19, 1993 (abandoned), which is a continuation of application Ser. No. 07/665,920, filed Mar. 4, 1991 (abandoned), which is a continuation of application Ser. No. 07/193,021, filed May 12, 1988 (abandoned), which is a continuation-in-part of Ser. No. 06/775,069, filed Sep. 11, 1985 (abandoned).

BACKGROUND FOR THE INVENTION

This invention relates to magneto-optic recording systems and, in particular, to magneto-optic recording systems that use thin film recording layers to record, reproduce and erase information data.

In 1957, a study showed that a thermo-pen can be used to record information data on a MnBi thin film. A magnetic domain can be written by the thermo-pen on the MnBi film as a result of the effect of heat from the thermo-pen.

Subsequently, development of lasers provided impetus for a comprehensive study of the effect of lasers on MnBi thin films. However, the research was of little practical utility because studies of laser sources and applications had not reached an advanced stage at that time.

By the 1970's, optical information processing techniques were significantly more advanced and studies of thin film recording layers resumed. The thin film recording layers studied were characterized by use of an amorphous rare earth transition metal alloy. Such films included binary alloy thin films like gadolinium-iron (GdFe), terbium-iron (TbFe), dysprosium-iron (DyFe) and gadolinium-iron (GdFe). Thin film recording layers containing amorphous rare earth transition metals are disclosed in Japanese Patent Publication No. 56-37607.

It was later found that use of ternary and quaternary alloys improved the properties of thin film recording layers. Such alloys included gadolinium-terbium-iron (GdTbFe) and gadolinium-terbium-iron-cobalt (GdTbFeCo). These alloys and their use as thin film recording layers are disclosed in Japanese Laid Open Publications Nos. 56-126907 and 57-94948.

Magnetic thin film recording layers operate to reproduce binary information bits because of a phenomenon known as the magneto-optic effect. To record information data, the temperature dependence of the magnetic coercivity ($H_c$) of the magnetic thin film recording layer is exploited. Magnetic coercivity is a measure of the force which must be applied to a magnetic field in order to reverse the magnetization of the materials.

To record an information bit on the thin film recording layer of a magneto-optic recording system, a small magnetic field bias is applied to the film and light flux from a laser is then focused on a small area (about one micrometer) of the film to heat that area to a temperature at which the magnetic coercivity of the film is less than the field bias or at which the area becomes paramagnetic.

The information bit is read by reflecting polarized light on the film surface. Rotation of the polarization of the reflected light is measured by transmission through a polarizor. This rotation is referred to as the magneto-optical Kerr effect. The rotation angle, also known as Kerr rotation angle, is measured in degrees or in minutes.

Erasure of the information bits is accomplished either by reversing the field bias and rewriting onto the film or by increasing the overall field bias until it exceeds the magnetic coercivity of the film.

Conventional magnetic thin film recording systems have several disadvantages. Specifically, the supply of heavy rare earth elements is limited. Furthermore, use of a large amount of only one specific heavy rare earth element is economically disadvantageous. For this reason, the cost of producing conventional types of magneto-optic recording systems using magnetic thin films is high.

Additionally, the magnetic thin films used in magneto-optic recording systems can be prepared by sputtering. An alloy target having a predetermined composition is primarily used as the sputtering target. However, heavy rare earth element and transition metal element alloys are very brittle. For this reason, it is difficult to produce a large alloy target.

In order to solve this problem, methods for disposing a rare earth element pellet on a transition metal sputtering target, for sputtering two separate targets of transition metal and rare earth metal simultaneously and alloying them on a substrate and for forming a composite target by pasting a transition metal and a rare earth metal together have been proposed. This last method is disclosed in Japanese Patent Laid Open Publication No. 51-63492. All of these methods are disadvantageous in that the composition of the ferromagnetic alloy thin film produced is not uniform and productivity is low.

In another method for producing a heavy rare earth-transition metal alloy target, the alloy target is sintered using a powder metallurgy procedure. The quality of the thin film produced by a sintered target is not good because impurities are inevitably contained in the sputtering target.

Accordingly it is desired to provide ferromagnetic thin film recording systems that overcome the disadvantages inherent in prior art systems.

SUMMARY OF THE INVENTION

Generally speaking, in accordance with the invention, a magnetic thin film of light rare earth elements, heavy rare earth elements and transition metal elements are provided. Other elements are optionally included in the film. Improved magneto-optic recording systems using these thin films as recording layers are also provided.

Accordingly, it is an object of the invention to provide improved magnetic thin films.

Another object of the invention is to provide improved magneto-optic recording systems.

A further object of the invention is to provide magneto-optic recording systems which have improved recording, reproducing and erasing properties.

Yet another object of the invention is to provide magneto-optic recording systems that can be mass produced at low cost.

Still other objects and advantages will in part be obvious and will in part be apparent from the specification and drawings.

The invention accordingly comprises the features of construction, combinations of elements and arrangements of parts which will be exemplified in the constructions hereinafter set forth, and the scope of the invention will be indicated in the claims.

BRIEF DESCRIPTION OF THE DRAWINGS

For a fuller understanding of the invention, reference is had to the following description taken in connection with the accompanying drawings, in which:

FIG. 10(a) is a cross-sectional view showing the structure of a particular magneto-optic recording system of the present invention.

FIG. 10(b) is a graph showing reproduction C/N (dB) as a function of frequency (MHz) for the magneto-optic recording system shown in FIG. 10(a) wherein C/N (carrier to noise ratio) is represented by the following formula:

$$C/N = 10 Log 10 Pc/Pn \quad (db)$$

wherein Pc is the reproducing power of information bit (carrier) frequency measured by specific frequency band width and Pn is the noise power of the same frequency measured by the same band width.

Figure 11:
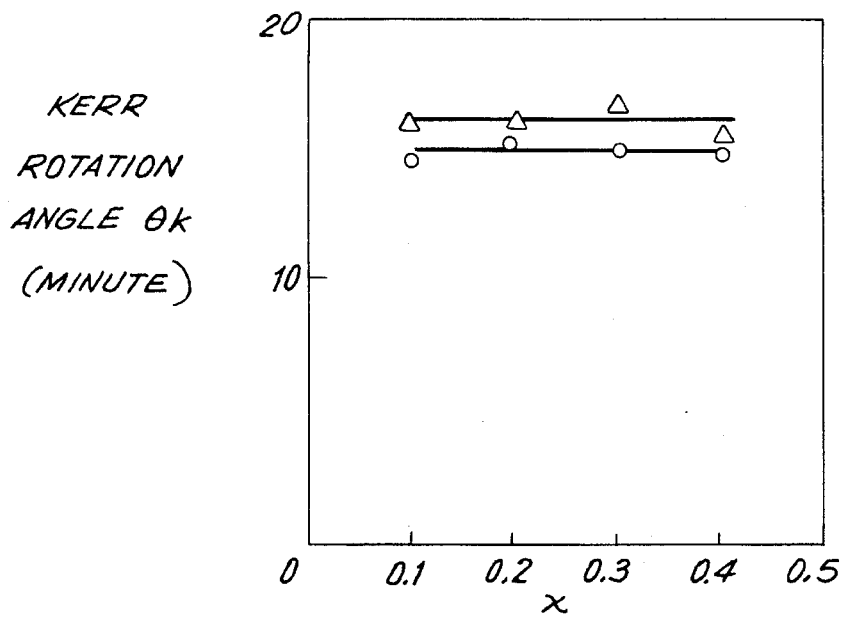

FIG. 11 is a graph showing Kerr rotation angle ($\theta_K$) (minutes) as a function of x where x defines the thin film composition $(Nd_{(1-x)}Dy_x)_{0.25}Fe_{0.75}$ or $(Nd_{(1-x)}Dy_x)_{0.15}Fe_{0.75}$.

Figure 12:
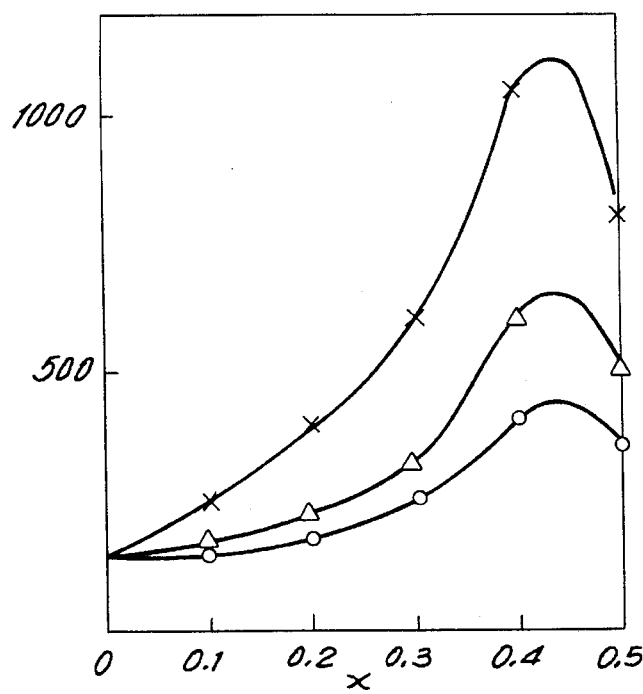

FIG. 12 is a graph showing the relationship between coercive force ($O_e$) as a function of x where x defines the thin film composition $(Nd_{1-x}R_{xc})_{0.25}Fe_{0.74}$ wherein R is Dy, Gd or Tb.

Figure 13:
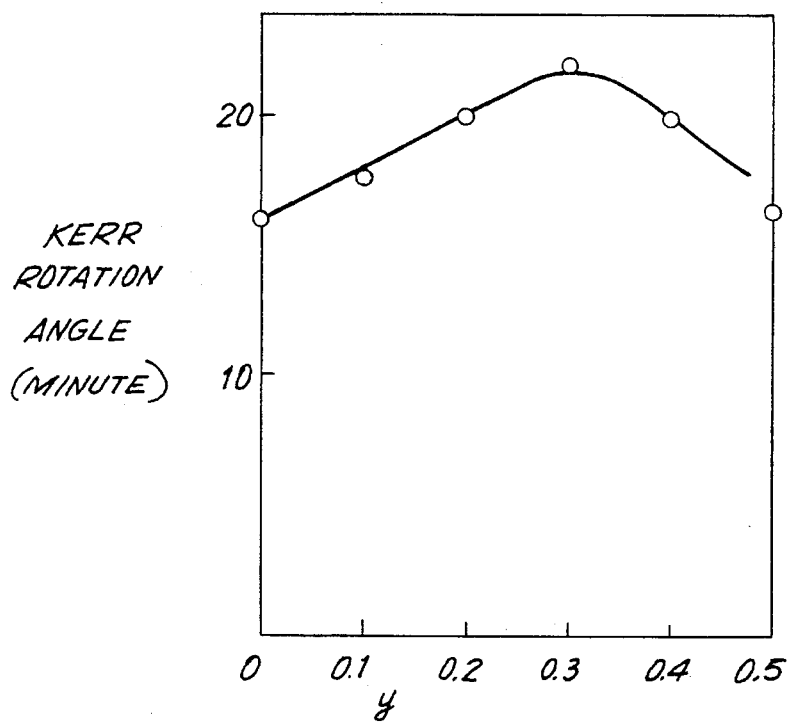

FIG. 13 is a graph showing Kerr rotation angle (minutes) as a function of y where y defines the thin film composition $(Nd_{0.6}Tb_{0.4})_{0.25}(Fe_{(0.9-y)}Co_yNi_{0.1})_{0.75}$.

Figure 14:
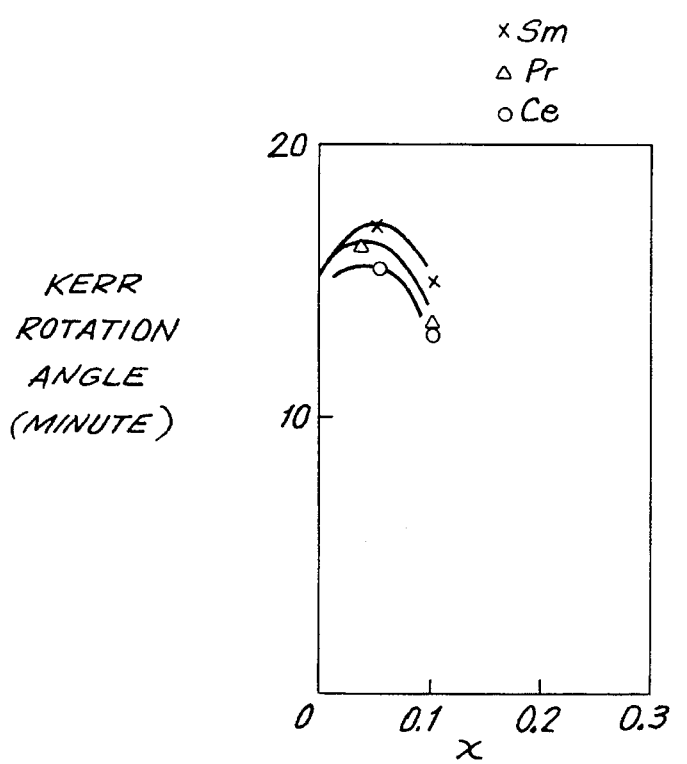

FIG. 14 is a graph showing Kerr rotation angle (minutes) as a function of x where x defines the thin film composition $[(Nd_{(1-x)}LR_x)_{0.6}Dy_{0.4}]_{0.25}Fe_{0.75}$ wherein LR is Sm, Pr or Ce.

Figure 15A:
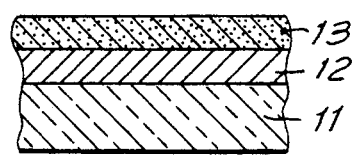
Figure 15B:
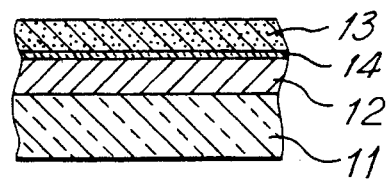

FIGS. 15(a) and 15(b) are cross-sectional views showing structures of particular magneto-optic recording systems of the present invention.

FIGS. 16(a)–16(f) are cross-sectional views of structures of particular magneto-optic recording systems of the present invention.

FIG. 17 is a graph showing Kerr rotation angle ($\theta_K$) (degrees) as a function of magnetic coercivity (Oersteds) for various magneto-optic recording systems of the present invention.

Figure 18A:
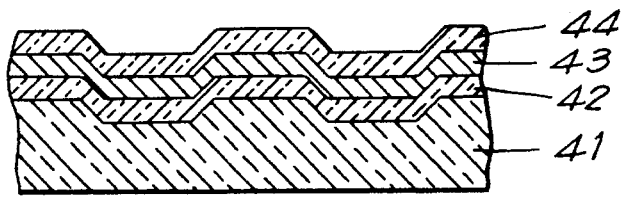

FIG. 18(a) is a cross-sectional view showing the structure of a particular magneto-optic recording system of the present invention.

Figure 18B:
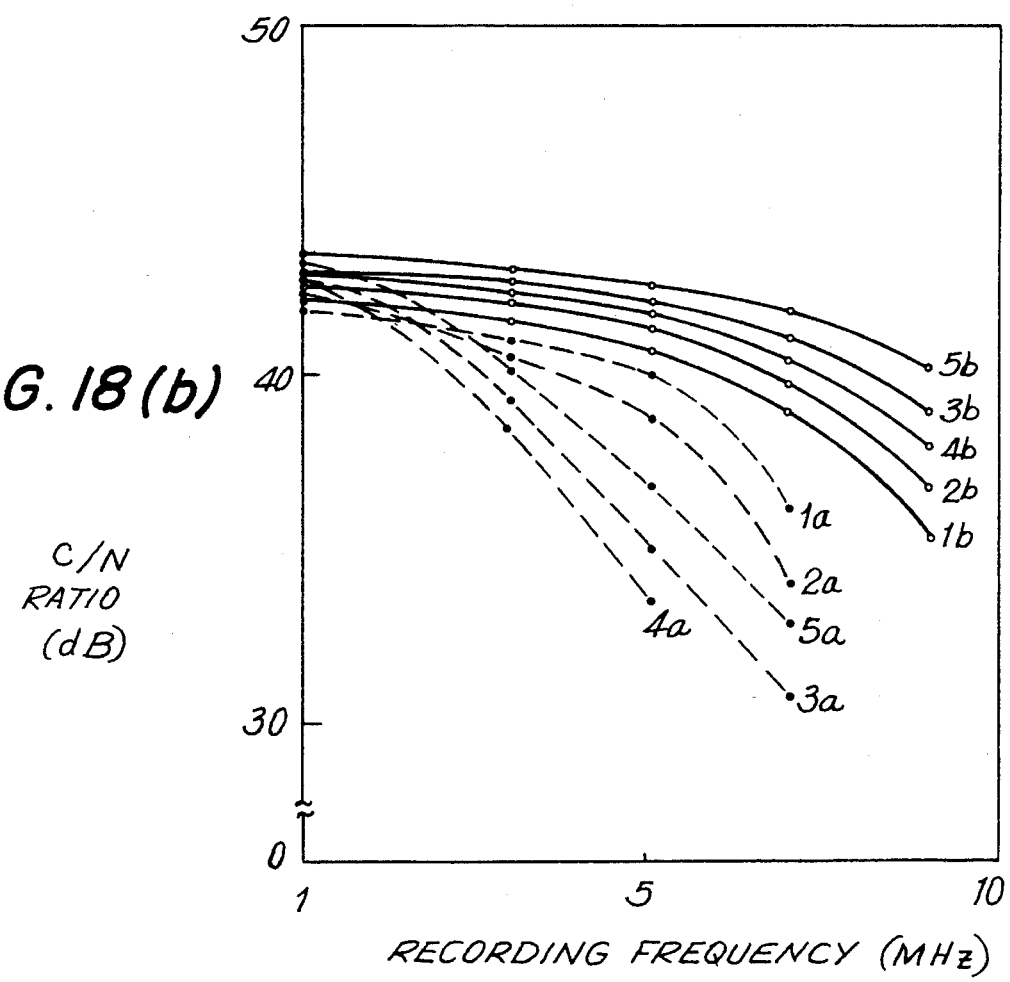

FIG. 18(b) is a graph showing C/N ratio (dB) as a function of recording frequency (MHz) for the magneto-optic recording system of FIG. 18(a).

Figure 19:
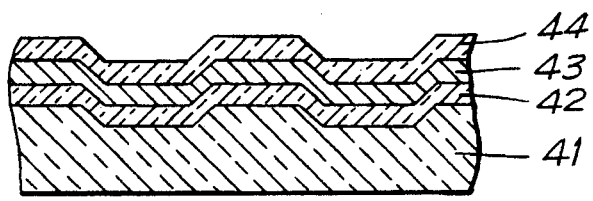
Figure 19:
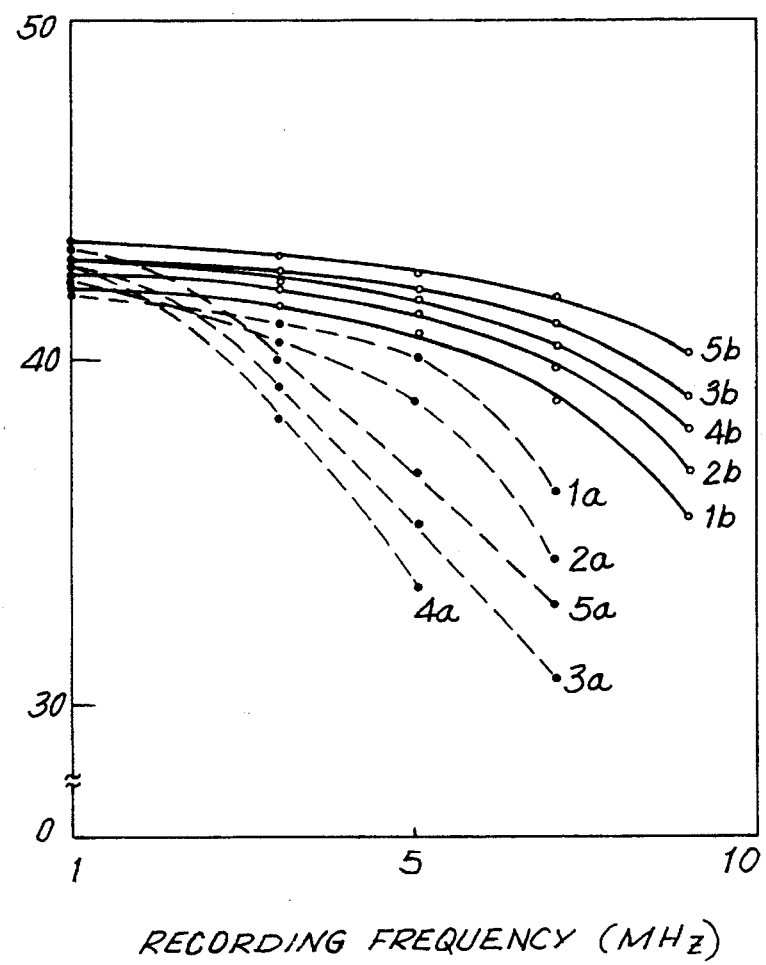

FIG. 19(a) is a cross-sectional view showing the structure of a particular magneto-optic recording system of the present invention.

FIG. 19(b) is a graph showing C/N ratio (dB) as a function of recording frequency (MHz) for the magneto-optic recording system of FIG. 19(a).

Figure 20:
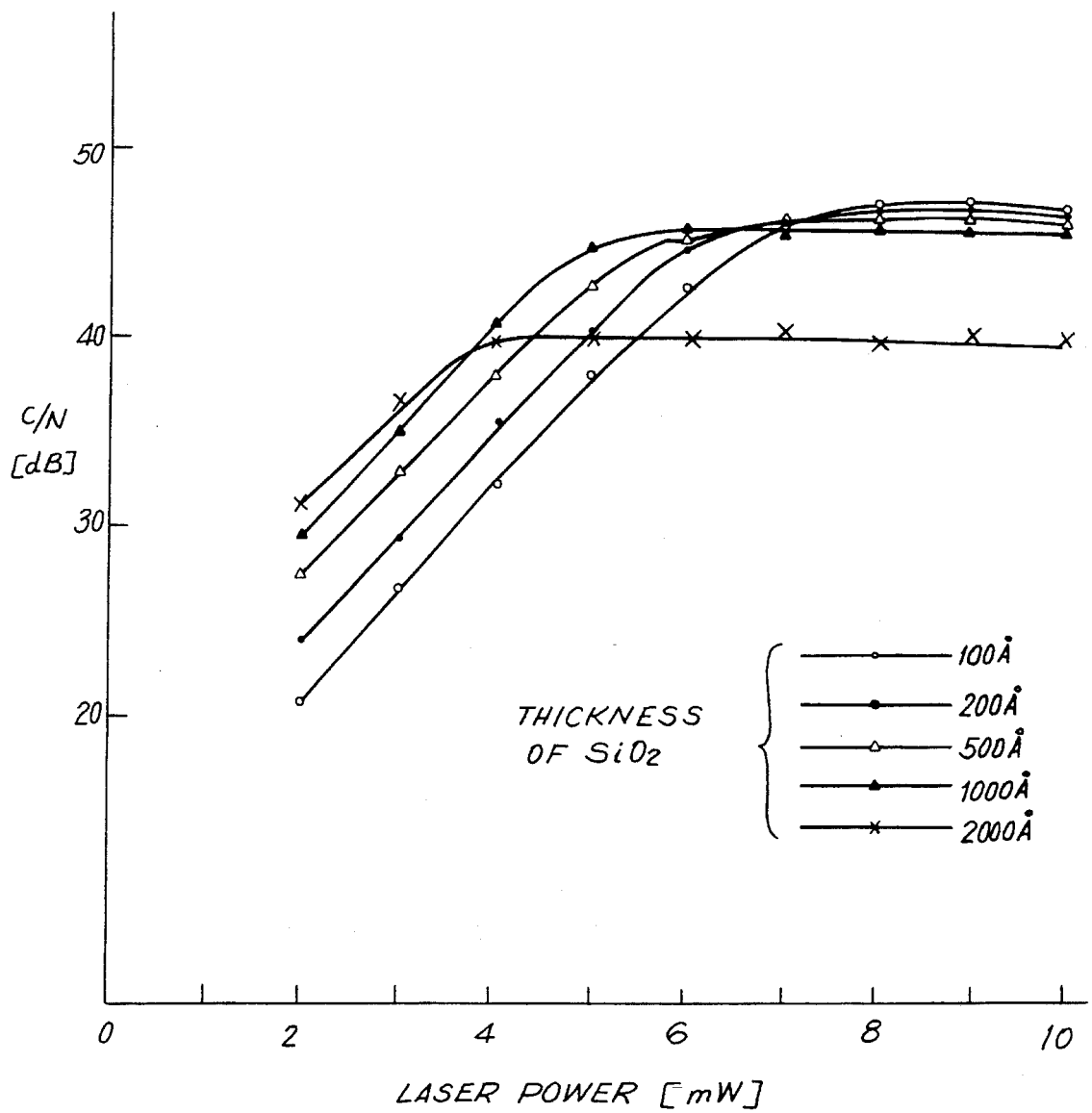

FIG. 20 is a graph showing C/N ratio (dB) as a function of laser power (mW) for a recording system in which a non-magnetic intermediate layer of varying thicknesses is provided between a magneto-optic thin film recording layer and a low magnetic coercivity material layer.

DETAILED DESCRIPTION OF THE INVENTION

The present invention is a magnetic thin film comprised of light rare earth elements, heavy rare earth elements and transition metal elements. Other elements are optionally included in the film. Magneto-optic recording systems using these thin films as recording layers are also part of the invention.

It has been found that a neodymium-iron (NdFe) alloy sputtering target can be formed by ordinary casting. The same effects are observed when other light rare earth elements are used. Heavy rare earth elements are added to the alloy by decreasing the amount of light rare earth element. Cobalt or nickel is added to the alloy by decreasing the amount of iron.

The composition can be represented by the equation $(LR_{1-x}HR_x)_yTM_{(1-y)}$ wherein LR represents the light rare earth element, HR represents the heavy rare earth element and TM represents the transition metal element. In a preferred embodiment of the invention, x is more than 0.05 and y is between about 0.2 and 0.4. The magnetic coercivity of the thin film is increased by the addition of heavy rare earth elements.

In the preferred embodiment of the invention a magnetic thin film is formed of at least one light rare earth element, at least one heavy rare earth element and at least one transition metal element. The light rare earth element is preferrably selected from the group consisting of samarium (Sm), neodymium (Nd), praseodymium (Pr) and cerium (Ce). The heavy rare earth element is preferrably selected from the group consisting of terbium (Tb), gadolinium (Gd) and dysprosium (Dy). The transition metal element is preferrably selected from the group consisting of iron (Fe), cobalt (Co) and nickel (Ni).

The composition can be represented by the equation $(LR_xHR_{(1-x)})_yTM_{1-y}$ where LR represents the light rare earth element, HR represents the heavy rare earth element and TM represents the transition metal element. In a preferred embodiment of the invention x is between 0 and abut 0.5 and y is between about 0.1 and about 0.4. More preferrably, x is between about 0.2 and about 0.5, and in a most preferred embodiment, x is between about 0.35 and about 0.5. Y is more preferrably between about 0.2 and about 0.4 and in a most preferred embodiment, y is between about 0.2 and about 0.35. This magnetic thin film employs a sufficient amount of light rare earth element and the coercive force is increased by the addition of heavy rare earth element.

The characteristics of the present invention will be explained in more detail in connection with the Examples.

EXAMPLE 1

NdFe alloy targets having a diameter of 150 mm were produced by melting and casting in a low frequency induction furnace. The alloy targets were used to prepare magnetic NdFe thin films on glass substrates by radio frequency sputtering.

Magnetic NdFe alloy thin films were prepared by changing the composition of the alloy targets and the temperature of the glass substrates. Perpendicularly magnetized alloy thin films were obtained when the alloy targets contained between about 20% and about 40% Nd by weight and the temperature of the glass substrates was between about 80° and about 250° C.

The temperature of the glass substrates was most preferably in the range of from about 160° to about 180°. It was found that when the temperature of the glass substrate was less than about 80° C. or greater than 250° C. perpendicularly magnetized alloy thin films were not obtained.

The alloy thin films obtained had the composition $Nd_xFe_{(1-x)}$ where x was the fractional amount of Nd in the composition expressed as a decimal.

Figure 1:
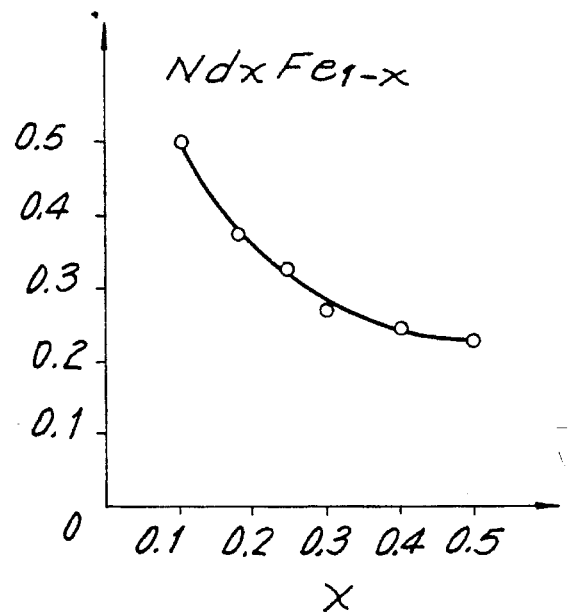
FIG. 1 is a graph showing the relationship between Kerr rotation angle ($\theta_K$)(degrees) as a function of x where x defines the thin film composition $Nd_xFe_{(1-x)}$.

FIG. 1 shows Kerr rotation angle ($\theta_K$)(degrees) as a function of x for these compositions with x varying between 0.1 and 0.5.

Figure 2:
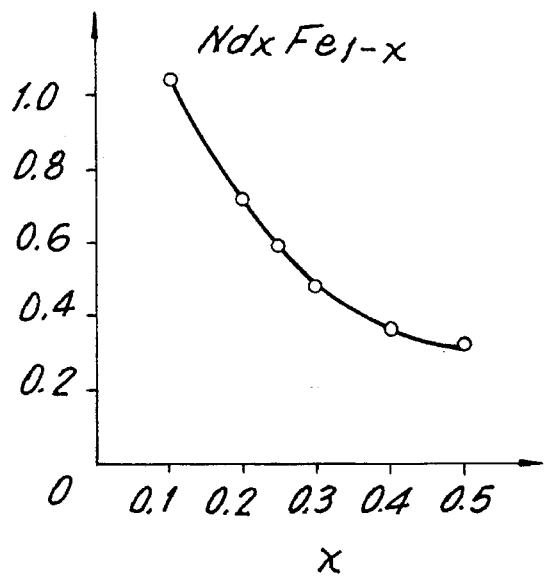
FIG. 2 is a graph showing the relationship between coercive force ($KO_e$) as a function of x where x defines the thin film composition of FIG. 1.

FIG. 2 shows coercive force ($KO_e$) as a function of x for these compositions with x varying between 0.1 and 0.5.

These perpendicularly magnetized thin films had sufficiently large Kerr rotation angles and coercivity to be used as recording layers in magneto-optic recording systems.

EXAMPLE 2

NdFeM alloy targets for sputtering were prepared. The targets had the composition $Nd0.3(Fe_{1-\beta}M_\beta)_{0.7}$ wherein M was Co or Ni and $\beta$ was 0.2, 0.3, 0.4, 0.5 or 0.6 and represented the fractional amount of M in the composition equal to 14, 21, 28, 35 and 42%, respectively. The alloy targets were used to produce magnetic NdFeM thin films on glass substrates by radio frequency sputtering. Except in the case where the NdFeM thin film was $Nd_{0.3}(Fe_{0.4}Co_{0.6})_{0.7}$, perpendicularly magnetized thin films were obtained.

Figure 3:
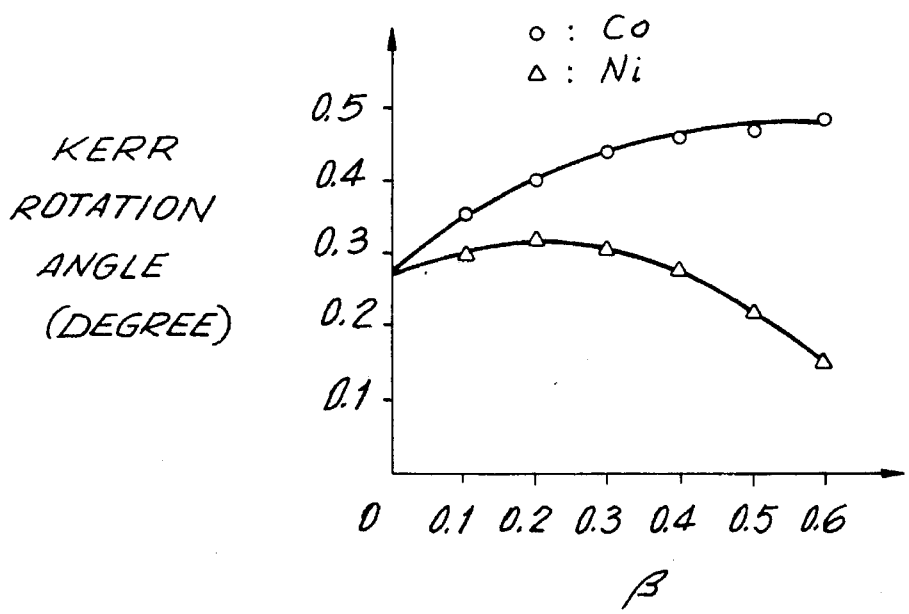
FIG. 3 is a graph showing the relationship between Kerr rotation angle ($\theta_K$)(degrees) as a function of $\beta$ where $\beta$ defines the thin film composition $Nd_{0.3}(Fe_{(1-\beta)}M_\beta)_{0.7}$ wherein M is Co or Ni.

FIG. 3 shows Kerr rotation angle ($\theta_K$)(degrees) as a function of $\beta$ for these compositions with $\beta$ varying between 0.1 and 0.6.

Figure 4:
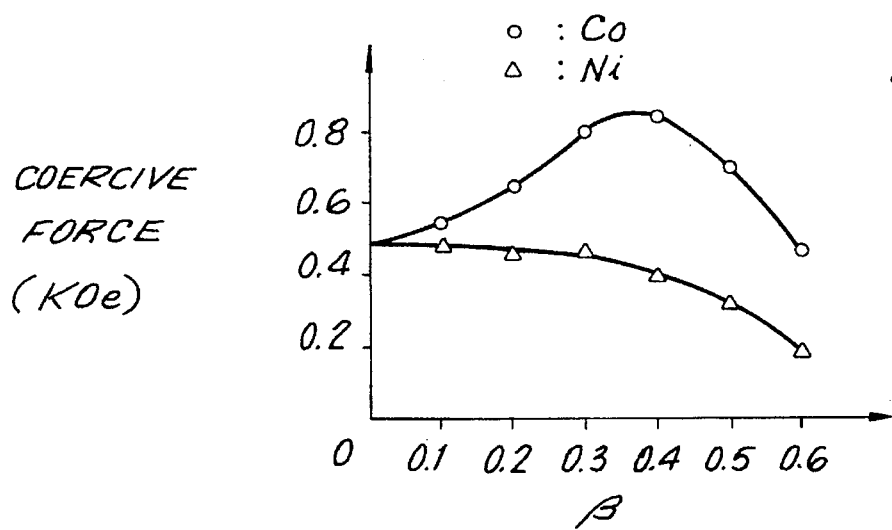
FIG. 4 is a graph showing the relationship between coercive force ($KO_e$) as a function of $\beta$ where $\beta$ defines the thin film composition of FIG. 3.

FIG. 4 shows coercive force ($KO_e$) as a function of $\beta$ for these compositions with $\beta$ varying between 0.1 and 0.6.

Figure 5:
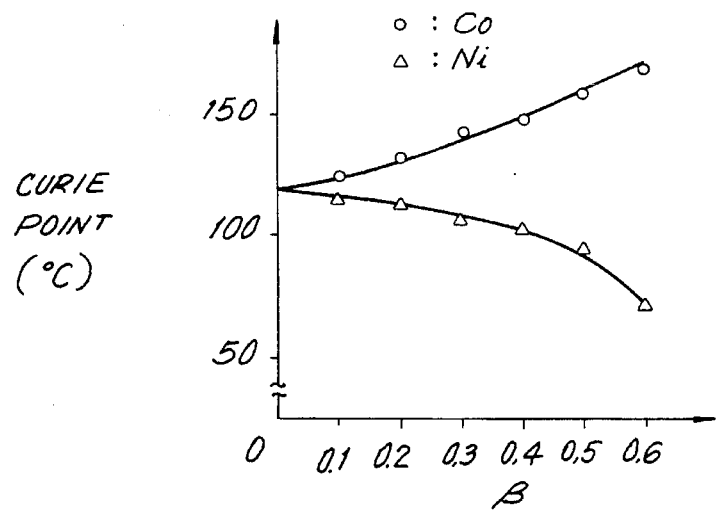
FIG. 5 is a graph showing the relationship between Curie point temperature (° C.) as a function of $\beta$ where $\beta$ defines the thin film composition of FIG. 3.

FIG. 5 shows Curie point (° C.) as a function of $\beta$ for these compositions and $\beta$ varying between 0.1 and 0.6.

As can be seen in FIGS. 3 and 4, Kerr rotation angle and coercivity are improved when Co is used in the composition, especially when compared to the compositions of Example 1. Kerr rotation angle is somewhat improved when Ni is used in this composition as compared to the composition of Example 1. However, when Ni is used and $\beta$ is greater than 0.5, the Curie point is outside of the range which is practical for use in magneto-optic recording systems.

EXAMPLE 3

Alloy thin films were prepared from alloy targets having the formula $(Nd_{1-\alpha}R_\alpha)_{0.70}Fe_{0.30}$ wherein R was selected from the group consisting of Ce, Pr and Sm and $\alpha$ ranged between 0 and 0.6.

Figure 6:
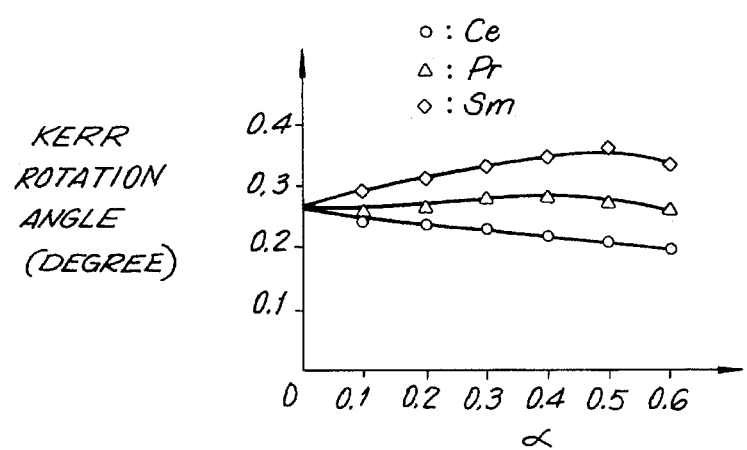
FIG. 6 is a graph showing Kerr rotation angle ($\theta_K$)(degrees) as a function of $\alpha$ where $\alpha$ defines the thin film composition $(Nd_{1-\alpha}R_\alpha)_{0.3}Fe_{0.7}$ wherein R is Ce, Pr or Sm.

FIG. 6 shows Kerr rotation angle ($\theta_K$)(degrees) as a function of $\alpha$ for these compositions with $\alpha$ varying between 0.1 and 0.6. When $\alpha$ is greater than 0.5, perpendicularly magnetized films were not obtained. Except in the case where Ce was used, the Kerr rotation angle remained constant or increased.

Figure 7:
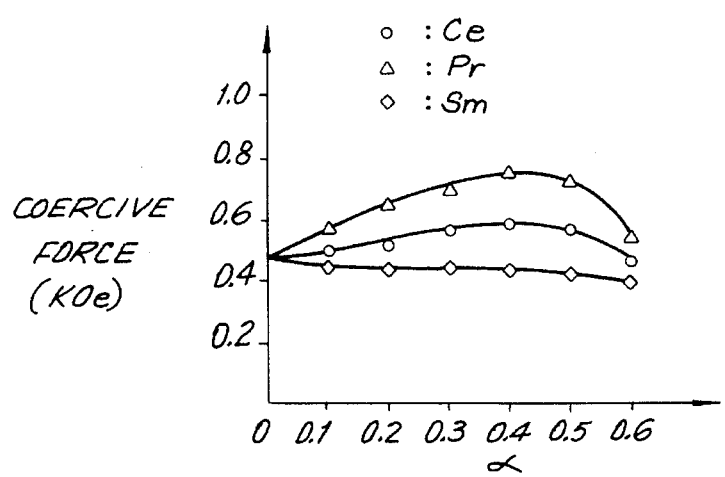
FIG. 7 is a graph showing the relationship between coercive force ($KO_e$) as a function of $\alpha$ where $\alpha$ defines the thin film composition of FIG. 6.

FIG. 7 shows coercive force ($KO_e$) as a function of $\alpha$ for these compositions with $\alpha$ varying between 0.1 and 0.6. Except where Sm was used, the coercive force increased until the composition reached the point where the film was no longer perpendicularly magnetized, i.e., at $\alpha$ greater than 0.5.

EXAMPLE 4

Thin films having the composition shown in Table 1 were prepared using alloy targets having the same compositions.

TABLE 1

| | |
|---|---|
| Example 1 | $(Nd_{0.7}Pr_{0.3})_{0.25}(Fe_{0.7}Co_{0.3})_{0.75}$ |
| Example 2 | $(Nd_{0.6}Sm_{0.4})_{0.3}(Fe_{0.7}Co_{0.3})_{0.7}$ |
| Example 3 | $(Nd_{0.7}Pr_{0.2}Sm_{0.1})_{0.25}(Fe_{0.6}Co_{0.4})_{0.75}$ |
| Example 4 | $(Nd_{0.8}Ce_{0.2})_{0.3}(Fe_{0.6}Co_{0.3}Ni_{0.1})_{0.7}$ |
| Comparison | |
| Example 1 | $Nd_{0.25}Fe_{0.75}$ |
| Example 2 | TbFe |
| Example 3 | GdFe |

The Kerr rotation angle ($\theta_K$)(degrees) and coercive force ($KO_e$) of each film are shown in Table 2.

TABLE 2

| | Kerr Rotation Angle (Degree) | Coercive Force ($KO_e$) |
|---|---|---|
| Example 1 | 0.42 | 1.3 |
| Example 2 | 0.46 | 0.9 |
| Example 3 | 0.48 | 1.2 |
| Example 4 | 0.35 | 1.5 |
| Comparison | | |
| Example 1 | 0.33 | 0.6 |
| Example 2 | 0.30 | 0.2 |
| Example 3 | 0.35 | 4 |

As can be seen in Table 2, compositions prepared using light rare earth elements and transition metal elements in combination with Nd and Fe have improved Kerr rotation angles and coercivity as compared to thin film compositions containing only Nd and Fe. Furthermore, these compositions have excellent properties as compared to TbFe and GdFe, well known compositions for use in magnetic thin films.

EXAMPLE 5

Using an alloy target having a diameter of 150 mm, a magnetic thin film was prepared on a water cooled glass substrate using radio frequency sputtering. The alloy target and, consequently, the magnetic thin film had the composition $Nd_{0.15}(Fe_{0.8}Ni_{0.2})_{0.83}B_{0.02}$. Then, without breaking the vacuum, a silicon dioxide protective film and a copper reflective film were formed on the magnetic thin film.

The magnetic and optic properties of the magnetic thin film at room temperature are shown in Table 3.

TABLE 3

| Properties | Value |
| --- | --- |
| Saturation Magnetization (Is) | 630 G |
| Coercive Force (Hc) | 1,500 $O_e$ |
| Constant of Magnetic Anistropy ($K_1$) | $6.2 \times 10^6$ erg/cm$^3$ |
| Kerr Rotation Angle ($\Theta_K$) | 26 min |
| Curie Point (Tc) | 142° C. |

As can be seen, the magnetic and optic properties of the thin film were good. The film structure is amorphous as shown by X-ray diffractometry. The film has an easy axis of magnetization perpendicular with respect to the film surface, i.e., the film is perpendicularly magnetized. Prior to measurement of the magneto-optic properties of the film at room temperature, the film was allowed to stand at high temperature and high humidity for a predetermined period of time. Then the reliability of the film was evaluated by measurement of the magneto-optic properties at room temperature.

Figure 8:
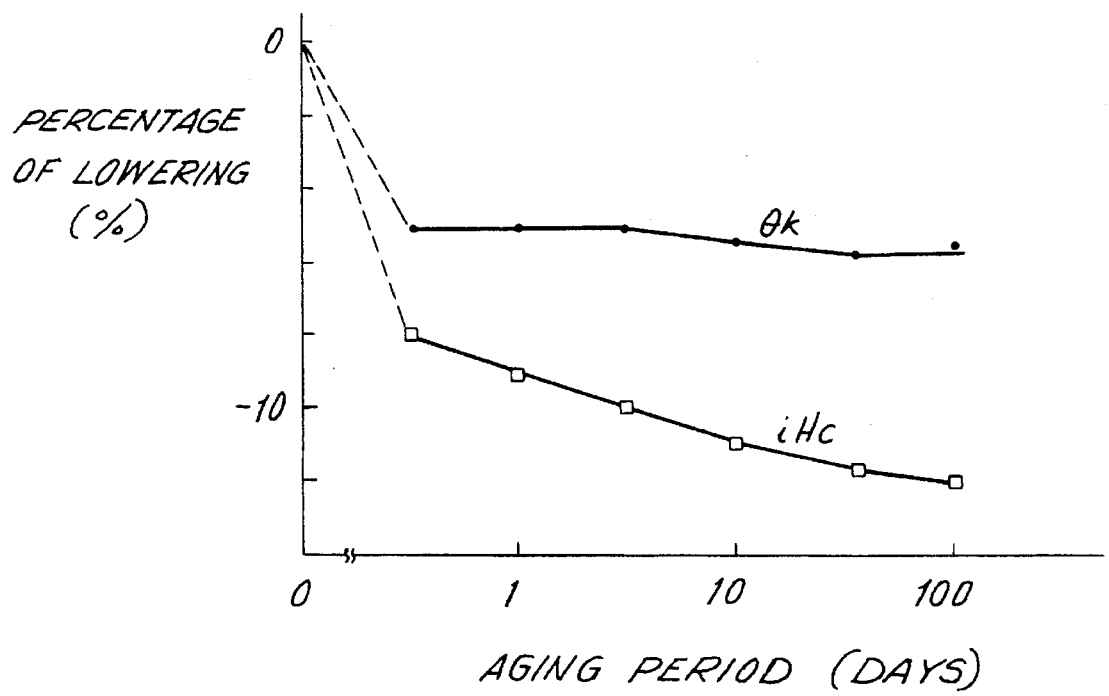
FIG. 8 is a graph showing percent lowering of coercive force (Hc) and Kerr rotation angle ($O_K$)(degrees) of Nd-Fe-Ni-B film as a function of aging period (days) at 60° and 90% humidity.

FIG. 8 shows the percent lowering of Kerr rotation angle ($\theta_K$) (degrees) and coercive force at 60° C. and 95% humidity over a period ranging from ½ day to 100 days.

Figure 9:
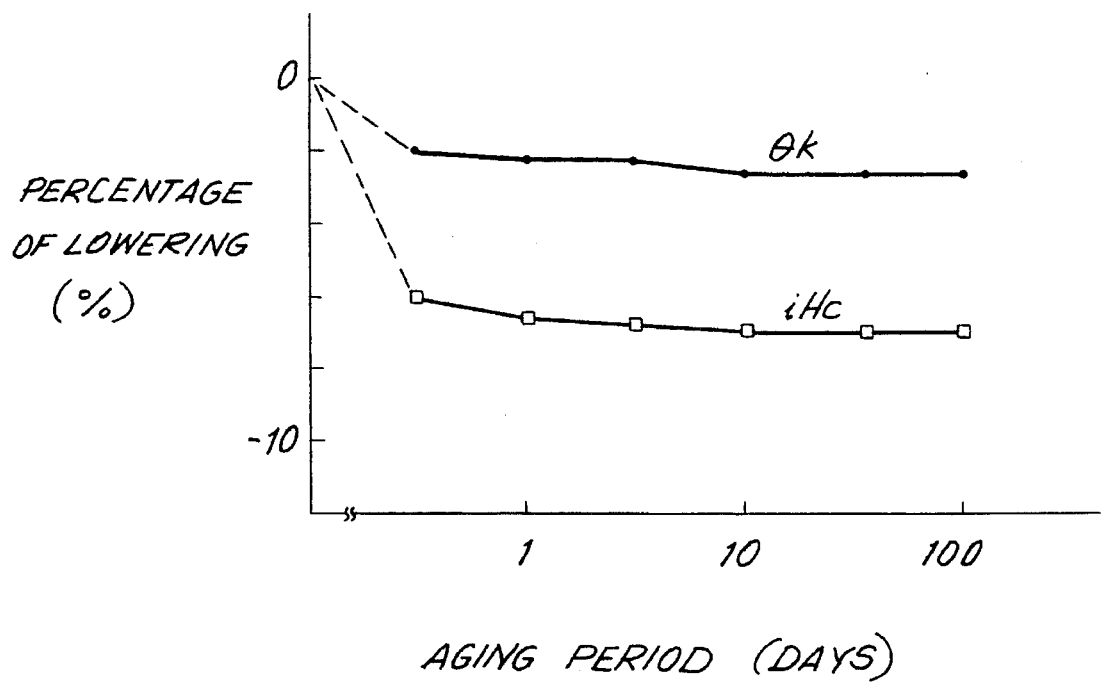
FIG. 9 is a graph showing percent lowering of coercive force (Hc) and Kerr rotation angle ($\theta_K$)(degrees) of Nd-Fe-Ni-B film as a function of aging period (days) at 90° C.

FIG. 9 shows the percent lowering of Kerr rotation angle and coercive force at 80° C. for a period ranging between about ½ day and 100 days.

The decrease in both Kerr rotation angle and coercive force is not a serious problem. In fact, the data shown in FIGS. 8 and 9 is much improved as compared with conventional data.

EXAMPLE 6

Alloy targets having the composition:

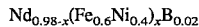

$Nd_{0.98-x}(Fe_{0.6}Ni_{0.4})_xB_{0.02}$ wherein x had the values 0.48, 0.58, 0.68, 0.78 and 0.88 were prepared. These targets were used to form magnetic thin films on glass substrates using radio frequency sputtering. Without breaking the vacuum, aluminum layers were deposited on the films by sputtering. The aluminum layer served as both a protective layer and a reflective layer.

All of the compositions were in an amorphous state, as confirmed by X-ray diffractometry, except the composition wherein x was equal to 0.48. When x was equal to 0.58, 0.68 and 0.78, magnetic thin films having an easy axis of magnetization perpendicular with respect to the film surfaces were obtained. Table 4 shows the film characteristics of these compositions.

TABLE 4

| Properties | X = 78 | X = 68 | X = 58 |
| --- | --- | --- | --- |
| Is (G) | 600 | 540 | 480 |
| Hc ($O_e$) | 1,800 | 1,400 | 1,200 |
| $K_1$ (erg/cm$^3$) | $5.8 \times 10^6$ | $5.0 \times 10^6$ | $4.8 \times 10^6$ |
| $O_K$ (min) | 30 | 26 | 24 |
| Tc (°C.) | 140 | 130 | 125 |
| Reflectance R (%) | 52 | 62 | 48 |

Table 5 shows the percent lowering of Kerr rotation angle and coercive force after the magnetic thin film were held at 80° C. for 100 days.

TABLE 5

| Properties | X = 78 | X = 68 | X = 58 |
| --- | --- | --- | --- |
| Percentage of (%) lowering of Hc | −2.5 | −2.2 | −2.1 |
| Percentage of (%) lowering of $\Theta_K$ | −1.2 | −2.0 | −1.1 |

Due to the relatively large amount of nickel in the ferro-magnetic thin films of this Example, more stable films were obtained than those of Example 5.

EXAMPLE 7

A 50 nanometer (nm) amorphous thin film having the composition $Nd_{0.20}(Fe_{0.7}Ni_{0.3})_{0.77}B_{0.3}$ and an easy axis of magnetization perpendicular with respect to the film surface and a 30 nm aluminum reflective layer were formed on a grooved substrate. The grooved substrate was formed by a photo polymerization method and had a groove pitch of 2.5 micrometers (μm), a groove width a 0.8μm, and a groove depth of 70 nm. Then a magneto-optic disk (FIG. 10(a)) having a substrate 1, a 2-P layer 2 formed on the substrate, a dielectric layer 3 formed on the 2-P layer, an Nd-Fe-Ni-B thin film layer 4 formed on the dielectric layer, an aluminum layer 5 formed on the thin film layer, a bonding layer 6 formed on the aluminum layer, and a second substrate layer 1 formed on the bonding layer was prepared. The structure of this film is shown in FIG. 10(a). The coercivity, Hc, of the disk was found to be 1.5 $KO_e$, the Kerr rotation angle, $\theta_K$, was 38 minutes and the Curie temperature was 140° C.

Data were recorded and reproduced on this magneto-optical disk by rotating the disk at 1800 rpm and using a semi-conductor laser. The recording power was 10 mW the recording magnetic field was 80 $O_e$, reproduction power was 1.2 mW and the band width was 30 KHz.

FIG. 10(b) shows reproduction C/N (dB) as a function of frequency (MHz). In the range where the frequency is less than 1 $MH_z$, C/N is a constant value of 56 dB.

EXAMPLE 8

Magnetic thin films were prepared by sputtering. The sputtering conditions were: Initial degree of vacuum less than $5 \times 10^{-7}$ Torr, argon pressure 5 mTorr and substrate bias voltage of 0 volts.

One of the thin films prepared had the composition $(Nd_{1-x}Dy_x)_yFe_{1-y}$. FIG. 11 shows the Kerr rotation angle ($\theta_K$) (minutes) as a function of x for x equal to 0.25 and 0.15. It can be seen that Kerr rotation angle is determined primarily by the amount of iron (Fe) in the composition. Even when the amount of dysprosium (Dy) is changed, the Kerr rotation angle remains about 18 minutes and does not change significantly. This value of Kerr rotation angle is substantially the same as that of terbium (Tb) and iron (Fe) when used in conventional magnetic thin films.

Thin film alloy compositions containing gadolinium (Gd) and terbium (Tb) were prepared. These compositions had substantially the same structure as that of the neodymium-dysprosium-iron composition of FIG. 11, except that gadolinium or terbium was used in place of the dysprosium. FIG. 12 shows the variation in coercive force as a function of x where the composition is defined as $(Nd_{1-x}HR_x)_{0.25}Fe_{0.75}$ where HR is Dy, Gd or Tb and where x varies between 0.1 and 0.5. The maximum coercive force is obtained when terbium is used as the heavy rare earth metal and x is about 0.4.

The coercive force bears a close relationship to the stability of the recorded bits and Kerr rotation angle is related to the readout characteristics of the recorded bits. As can be seen from an examination of FIGS. 11 and 12, the Kerr rotation angle does not decrease even when coercive force has a maximum value. The fact that the addition of heavy rare earth metals in neodymium-iron compositions increases coercive force while keeping Kerr rotation angle constant is advantageous. As can be seen in FIG. 11, Kerr rotation angle ($\theta_K$) is the same as that of conventional TbFe alloy thin films. Furthermore, in order to obtain larger Kerr rotation angles ($\theta_K$) (degrees), Co and Ni are added by decreasing the amount of Fe. Specifically, compositions defined as $(Nd_{0.6}Tb_{0.4})_{0.25}(Fe_{0.9-y}Co_yNi_{0.1})_{0.75}$ where y represents the fractional amount of cobalt in the composition expressed as a decimal were prepared.

FIG. 13 shows the dependence of Kerr rotation angle ($\theta_K$) (minutes) on the fractional amount y of Co in this composition. Kerr rotation angle reaches a maximum value at 22 minutes when y is 0.3. This is the same maximum value of Kerr rotation angle as that of GdFe, which is well-known as having a large value. No change in the coercive force is observed when Co and Ni are added with decreasing amounts of Fe. If we define R to represent reflectance, the C/N ratio of recording and reproducing is proportional to the square root of R times the Kerr rotation angle. Therefore, C/N ratio is improved as Kerr rotation angle is increased.

FIG. 14 shows the dependence of Kerr rotation angle ($\theta_K$) (minutes) as a function of x where x is the fractional amount of a light rare earth element in the composition:

$[(Nd_{1-x}LR_x)_{0.6}Dy_{0.4}]_{0.25}Fe_{0.75}$ wherein LR is Sm, Ce or Pr. As can be seen in FIG. 14, the largest Kerr rotation angle is obtained when Sm is used, the second largest Kerr rotation angle is obtained when Ce is used and the smallest Kerr rotation angle is obtained when Pr is used. For the addition of any of the light rare earth elements, the maximum Kerr rotation angle is achieved when x, the fractional amount of the light rare earth element expressed as a decimal, is 0.05.

FIGS. 15(a) and 15(b) show the structure of two particular magneto-optic recording systems prepared in accordance with this invention. In both systems, a substrate 11, a magneto-optic recording layer 12 on the substrate, and a low magnetic coercivity material layer 13 on the magneto-optic recording layer were provided. In FIG. 15(b), a transparent dielectric layer 14 was provided between the magneto-optic recording layer and the substrate.

In these structures, a magneto-optic thin film recording layer was formed on a transparent substrate like glass or plastic. An optical head for recording and writing was positioned at the side of the transparent substrate. A lightbeam for recording was irradiated onto the magneto-optic thin film recording layer through the transparent substrate. No problems arose when the optical head was positioned on the side of the magneto-optic thin film recording layer or, as in this case, on the side of the multi-layers of low magnetic coercivity material 13, magneto-optic thin film recording material 12, and/or transparent dielectric material 14 formed on the substrate 11. Furthermore, this system is not limited to the specific structure discussed. A protective layer, an anti-reflective layer, a multi-intervention enhancement layer, a transparent conductive layer and the like can also be provided.

EXAMPLE 9

Tables 6-13 show the relationship between the structures of various magneto-optic recorded systems of the present invention and Kerr rotation angle.

TABLE 6

| Ex. No. | Substrate | First Layer | Second Layer | Third Layer | Fourth Layer | Kerr Rotation Angle (Degree) |
|---|---|---|---|---|---|---|
| 1 | Glass | NdFeTi | Amorphous CoTi | | | 0.55 |
| 2 | Glass | NdFeTi | Al | | | 0.27 |
| 3 | Glass | SiO$_2$ | NdFeTi | Amorphous CoTi | | 1.71 |
| 4 | Glass | SiO$_2$ | NdFeTi | Al | | 0.85 |
| 5 | Glass | SiO$_2$ | NdFeTi | SiO$_2$ | Amorphous CoTi | 2.1 |
| 6 | Glass | SiO$_2$ | NdFeTi | SiO$_2$ | Al | 1.14 |
| 7 | PMMA | NdFeTi | Amorphous CoTi | | | 0.45 |
| 8 | PMMA | NdFeTi | Al | | | 0.22 |
| 9 | PMMA | SiO$_2$ | NdFeTi | Amorphous CoTi | | 1.59 |
| 10 | PMMA | SiO$_2$ | NdFeTi | Al | | 0.73 |
| 11 | PMMA | SiO$_2$ | NdFeTi | SiO$_2$ | Amorphous CoTi | 1.93 |
| 12 | PMMA | SiO$_2$ | NdFeTi | SiO$_2$ | Al | 1.11 |
| 13 | Glass | NdFeTi | Amorphous CoZrNb | | | 0.57 |
| 14 | Glass | NdFeTi | Amorphous CoTi | | | 0.54 |
| 15 | Glass | PrFeZr | Amorphous CoTi | | | 0.42 |
| 16 | Glass | PrFeZr | Al | | | 0.21 |
| 17 | Glass | CeFeTaCr | Amorphous CoTi | | | 0.39 |
| 18 | Glass | CeFeTaCr | Al | | | 0.19 |
| 19 | Glass | NdSmFe | Amorphous CoTi | | | 0.41 |
| 20 | Glass | NdSmFe | Al | | | 0.20 |

TABLE 6-continued

| Ex. No. | Substrate | STRUCTURE First Layer | Second Layer | Third Layer | Fourth Layer | Kerr Rotation Angle (Degree) |
|---|---|---|---|---|---|---|
| 21 | Glass | NdFeHfCo | Amorphous CoTi | | | 0.41 |
| 22 | Glass | NdFeHfCo | Al | | | 0.19 |
| 23 | PMMA | SiO$_2$ | TbFe | Amorphous CoTi | | 1.05 |
| 24 | PMMA | SiO$_2$ | TbFe | Al | 0.61 | |

TABLE 7

| Ex. No. | Substrate | STRUCTURE First Layer | Second Layer | Third Layer | Fourth Layer | Kerr Rotation Angle (Degree) |
|---|---|---|---|---|---|---|
| 1 | Glass | NdFeB | Amorphous CoTi | | | 0.55 |
| 2 | Glass | NdFeB | Al | | | 0.27 |
| 3 | Glass | SiO$_2$ | NdFeB | Amorphous CoTi | | 1.71 |
| 4 | Glass | SiO$_2$ | NdFeB | Al | | 0.85 |
| 5 | Glass | SiO$_2$ | NdFeB | SiO$_2$ | Amorphous CoTi | 2.1 |
| 6 | Glass | SiO$_2$ | NdFeB | SiO$_2$ | Al | 1.14 |
| 7 | PMMA | NdFeB | Amorphous CoZrNb | | | 0.45 |
| 8 | PMMA | NdFeB | Al | | | 0.22 |
| 9 | PMMA | SiO$_2$ | NdFeB | Amorphous CoTi | | 1.59 |
| 10 | PMMA | SiO$_2$ | NdFeB | Al | | 0.73 |
| 11 | PMMA | SiO$_2$ | NdFeB | SiO$_2$ | Amorphous CoTi | 1.93 |
| 12 | PMMA | SiO$_2$ | NdFeB | SiO$_2$ | Al | 1.11 |
| 13 | Glass | NdFeB | Amorphous CoZrNb | | | 0.57 |
| 14 | Glass | NdFeB | Amorphous CoTa | | | 0.54 |
| 15 | Glass | PrFeP | Amorphous CoTi | | | 0.42 |
| 16 | Glass | PrFeP | Al | | | 0.21 |
| 17 | Glass | CeFeAlC | Amorphous CoTi | | | 0.39 |
| 18 | Glass | CeFeAlC | Al | | | 0.19 |
| 19 | Glass | NdPrFe | Amorphous CoTi | | | 0.41 |
| 20 | Glass | NdPrFe | Al | | | 0.20 |
| 21 | Glass | NdFeSiCo | Amorphous CoTi | | | 0.41 |
| 22 | Glass | NdFeSiCo | Al | | | 0.19 |
| 23 | PMMA | SiO$_2$ | TbFe | Amorphous CoTi | | 1.05 |
| 24 | PMMA | SiO$_2$ | TbFe | Al | | 0.61 |

TABLE 8

| Ex. No. | Substrate | STRUCTURE First Layer | Second Layer | Third Layer | Fourth Layer | Kerr Rotation Angle (Degree) |
|---|---|---|---|---|---|---|
| 1 | Glass | NdFeTi | Amorphous FeSiB | | | 0.55 |
| 2 | Glass | NdFeTi | Al | | | 0.27 |
| 3 | Glass | SiO$_2$ | NdFeB | Amorphous FeSiB | | 1.71 |
| 4 | Glass | SiO$_2$ | NdFeB | Al | | 0.85 |
| 5 | Glass | SiO$_2$ | NdFeB | SiO$_2$ | Amorphous FeSiB | 2.1 |
| 6 | Glass | SiO$_2$ | NdFeB | SiO$_2$ | Al | 1.14 |

TABLE 8-continued

| Ex. No. | Substrate | STRUCTURE First Layer | Second Layer | Third Layer | Fourth Layer | Kerr Rotation Angle (Degree) |
|---|---|---|---|---|---|---|
| 7 | PMMA | NdFeTi | Amorphous FeSiB | | | 0.45 |
| 8 | PMMA | NdFeTi | Al | | | 0.22 |
| 9 | PMMA | SiO$_2$ | NdFeTi | Amorphous FeSiB | | 1.59 |
| 10 | PMMA | SiO$_2$ | NdFeTi | Al | | 0.73 |
| 11 | PMMA | SiO$_2$ | NdFeTi | SiO$_2$ | Amorphous FeSiB | 1.93 |
| 12 | PMMA | SiO$_2$ | NdFeTi | SiO$_2$ | Al | 1.11 |
| 13 | Glass | NdFeTi | Amorphous FeCoSiB | | | 0.57 |
| 14 | Glass | NdFeTi | Amorphous FeNiP | | | 0.54 |
| 15 | Glass | PrFeTa | Amorphous FeSiB | | | 0.42 |
| 16 | Glass | PrFeTa | Al | | | 0.21 |
| 17 | Glass | CeFeCoZr | Amorphous FeSiB | | | 0.39 |
| 18 | Glass | CeFeCoZr | Al | | | 0.19 |
| 19 | Glass | NdPrFeMo | Amorphous FeSiB | | | 0.41 |
| 20 | Glass | NdPrFeMo | Al | | | 0.20 |
| 21 | Glass | NdFeNbCr | Amorphous FeSiB | | | 0.41 |
| 22 | Glass | NdFeNbCr | Al | | | 0.19 |
| 23 | PMMA | SiO$_2$ | TbFe | Amorphous FeSiB | | 1.05 |
| 24 | PMMA | SiO$_2$ | TbFe | Al | | 0.61 |

TABLE 9

| Ex. No. | Substrate | STRUCTURE First Layer | Second Layer | Third Layer | Fourth Layer | Kerr Rotation Angle (Degree) |
|---|---|---|---|---|---|---|
| 1 | Glass | NdFeB | Amorphous FeSiB | | | 0.55 |
| 2 | Glass | NdFeB | Al FeSiB | | | 0.27 |
| 3 | Glass | SiO$_2$ | NdFeB | Amorphous FeSiB | | 1.71 |
| 4 | Glass | SiO$_2$ | NdFeB | Al | | 0.85 |
| 5 | Glass | SiO$_2$ | NdFeB | SiO$_2$ | Amorphous FeSiB | 2.1 |
| 6 | Glass | SiO$_2$ | NdFeB | SiO$_2$ | Al | 1.14 |
| 7 | PMMA | NdFeB | Amorphous FeSiB | | | 0.45 |
| 8 | PMMA | NdFeB | Al | | | 0.22 |
| 9 | PMMA | SiO$_2$ | NdFeB | Amorphous FeSiB | | 1.59 |
| 10 | PMMA | SiO$_2$ | NdFeB | Al | | 0.73 |
| 11 | PMMA | SiO$_2$ | NdFeB | SiO$_2$ | Amorphous FeSiB | 1.93 |
| 12 | PMMA | SiO$_2$ | NdFeB | SiO$_2$ | Al | 1.11 |
| 13 | Glass | NdFeB | Amorphous FeCoSiB | | | 0.57 |
| 14 | Glass | NdFeB | Amorphous FeNiP | | | 0.54 |
| 15 | Glass | PrFeP | Amorphous FeSiB | | | 0.42 |
| 16 | Glass | PrFeP | Al | | | 0.21 |
| 17 | Glass | CeFeAlC | Amorphous FeSiB | | | 0.39 |
| 18 | Glass | CeFeAlC | Al | | | 0.19 |
| 19 | Glass | NdPrFe | Amorphous FeSiB | | | 0.41 |
| 20 | Glass | NdPrFe | Al | | | 0.20 |
| 21 | Glass | NdFeSiCo | Amorphous FeSiB | | | 0.41 |

TABLE 9-continued

| Ex. No. | Substrate | STRUCTURE First Layer | Second Layer | Third Layer | Fourth Layer | Kerr Rotation Angle (Degree) |
|---|---|---|---|---|---|---|
| 22 | Glass | NdFeSiCo | Al | | | 0.19 |
| 23 | PMMA | SiO$_2$ | TbFe | Amorphous FeSiB | | 1.05 |
| 24 | PMMA | SiO$_2$ | TbFe | Al | | 0.61 |

TABLE 10

| Ex. No. | Substrate | STRUCTURE First Layer | Second Layer | Third Layer | Fourth Layer | Kerr Rotation Angle (Degree) |
|---|---|---|---|---|---|---|
| 1 | Glass | NdFeTi | CuMoFeNi | | | 0.55 |
| 2 | Glass | NdFeTi | Al | | | 0.27 |
| 3 | Glass | SiO$_2$ | NdFeTi | CuMoFeNi | | 1.71 |
| 4 | Glass | SiO$_2$ | NdFeTi | Al | | 0.85 |
| 5 | Glass | SiO$_2$ | NdFeTi | SiO$_2$ | CuMoFeNi | 2.1 |
| 6 | Glass | SiO$_2$ | NdFeTi | SiO$_2$ | Al | 1.14 |
| 7 | PMMA | NdFeTi | CuMoFeNi | | | 0.45 |
| 8 | PMMA | NdFeTi | Al | | | 0.22 |
| 9 | PMMA | SiO$_2$ | NdFeTi | CuMoFeNi | | 1.59 |
| 10 | PMMA | SiO$_2$ | NdFeTi | Al | | 0.73 |
| 11 | PMMA | SiO$_2$ | NdFeTi | SiO$_2$ | CuMoFeNi | 1.93 |
| 12 | PMMA | SiO$_2$ | NdFeTi | SiO$_2$ | Al | 1.11 |
| 13 | | NdFeTi | MoMnFeNi | | | 0.57 |
| 14 | | NdFeTi | CuCrFeNi | | | 0.54 |
| 15 | PMMA | PrFeTa | CuMoFeNi | | | 0.42 |
| 16 | PMMA | PrFeTa | Al | | | 0.21 |
| 17 | PMMA | CeFeZrCo | CuMoFeNi | | | 0.39 |
| 18 | PMMA | CeFeZrCo | Al | | | 0.19 |
| 19 | PMMA | NdPrFeMo | CuMoFeNi | | | 0.41 |
| 20 | PMMA | NdPrFeMo | Al | | | 0.20 |
| 21 | PMMA | NdFeNbCr | CuMoFeNi | | | 0.41 |
| 22 | PMMA | NdFeNbCr | Al | | | 0.19 |
| 23 | PMMA | SiO$_2$ | TbFe | CuMoFeNi | | 1.05 |
| 24 | PMMA | SiO$_2$ | TbFe | Al | | 0.61 |

TABLE 11

| Ex. No. | Substrate | STRUCTURE First Layer | Second Layer | Third Layer | Fourth Layer | Kerr Rotation Angle (Degree) |
|---|---|---|---|---|---|---|
| 1 | Glass | NdFeB | CuMoFeNi | | | 0.55 |
| 2 | Glass | NdFeB | Al | | | 0.27 |
| 3 | Glass | SiO$_2$ | NdFeB | CuMoFeNi | | 1.71 |
| 4 | Glass | SiO$_2$ | NdFeB | Al | | 0.85 |
| 5 | Glass | SiO$_2$ | NdFeB | SiO$_2$ | CuMoFeNi | 2.1 |
| 6 | Glass | SiO$_2$ | NdFeB | SiO$_2$ | Al | 1.14 |
| 7 | PMMA | NdFeB | CuMoFeNi | | | 0.45 |
| 8 | PMMA | NdFeB | Al | | | 0.22 |
| 9 | PMMA | SiO$_2$ | NdFeB | CuMoFeNi | | 1.59 |
| 10 | PMMA | SiO$_2$ | NdFeB | Al | | 0.73 |
| 11 | PMMA | SiO$_2$ | NdFeB | SiO$_2$ | CuMoFeNi | 1.93 |
| 12 | PMMA | SiO$_2$ | NdFeB | SiO$_2$ | Al | 1.11 |
| 13 | Glass | NdFeB | MoMnFeNi | | | 0.57 |
| 14 | Glass | NdFeB | CuCrFeNi | | | 0.54 |
| 15 | Glass | PrFeP | CuMoFeNi | | | 0.42 |
| 16 | Glass | PrFeP | Al | | | 0.21 |
| 17 | Glass | CeFeAlC | CuMoFeNi | | | 0.39 |
| 18 | Glass | CeFeAlC | Al | | | 0.19 |
| 19 | Glass | NdPrFe | CuMoFeNi | | | 0.41 |
| 20 | Glass | NdPrFe | Al | | | 0.20 |
| 21 | Glass | NdFeSiCo | CuMoFeNi | | | 0.41 |
| 22 | Glass | NdFeSiCo | Al | | | 0.19 |
| 23 | PMMA | SiO$_2$ | TbFe | CuMoFeNi | | 1.05 |

TABLE 11-continued

| Ex. No. | Substrate | STRUCTURE First Layer | Second Layer | Third Layer | Fourth Layer | Kerr Rotation Angle (Degree) |
|---|---|---|---|---|---|---|
| 24 | PMMA | SiO$_2$ | TbFe | Al | | 0.61 |

TABLE 12

| Ex. No. | Substrate | STRUCTURE First Layer | Second Layer | Third Layer | Fourth Layer | Kerr Rotation Angle (Degree) |
|---|---|---|---|---|---|---|
| 1 | Glass | NdFeTi | FeAlSi | | | 0.55 |
| 2 | Glass | NdFeTi | Al | | | 0.27 |
| 3 | Glass | SiO$_2$ | NdFeTi | FeAlSi | | 1.71 |
| 4 | Glass | SiO$_2$ | NdFeTi | Al | | 0.85 |
| 5 | Glass | SiO$_2$ | NdFeTi | SiO$_2$ | FeAlSi | 2.1 |
| 6 | Glass | SiO$_2$ | NdFeTi | SiO$_2$ | Al | 1.14 |
| 7 | PMMA | NdFeTi | FeAlSi | | | 0.45 |
| 8 | PMMA | | Al | | | 0.22 |
| 9 | PMMA | SiO$_2$ | NdFeB | FeAlSi | | 1.59 |
| 10 | PMMA | SiO$_2$ | NdFeB | Al | | 0.73 |
| 11 | PMMA | SiO$_2$ | NdFeB | SiO$_2$ | FeAlSi | 1.93 |
| 12 | PMMA | SiO$_2$ | NdFeB | SiO$_2$ | Al | 1.11 |
| 13 | | NdFeTi | FeAlSiNi | | | 0.57 |
| 14 | PMMA | PrFeTa | FeAlSi | | | 0.42 |
| 15 | PMMA | PrFeTa | Al | | | 0.21 |
| 16 | PMMA | CeFeZrCo | FeAlSi | | | 0.39 |
| 17 | PMMA | CeFeZrCo | Al | | | 0.19 |
| 18 | PMMA | NdPrFeMo | FeAlSi | | | 0.41 |
| 19 | PMMA | NdPrFeMo | Al | | | 0.20 |
| 20 | PMMA | NdFeNbCr | FeAlSi | | | 0.41 |
| 21 | PMMA | NdFeNbCr | Al | | | 0.19 |
| 22 | PMMA | SiO$_2$ | TbFe | FeAlSi | | 0.05 |
| 23 | PMMA | SiO$_2$ | TbFe | Al | | 0.61 |

TABLE 13

| Ex. No. | Substrate | STRUCTURE First Layer | Second Layer | Third Layer | Fourth Layer | Kerr Rotation Angle (Degree) |
|---|---|---|---|---|---|---|
| 1 | Glass | NdFeB | FeAlSi | | | 0.55 |
| 2 | Glass | NdFeB | Al | | | 0.27 |
| 3 | Glass | SiO$_2$ | NdFeB | FeAlSi | | 1.71 |
| 4 | Glass | SiO$_2$ | NdFeB | Al | | 0.85 |
| 5 | Glass | SiO$_2$ | NdFeB | SiO$_2$ | FeAlSi | 2.1 |
| 6 | Glass | SiO$_2$ | NdFeB | SiO$_2$ | Al | 1.14 |
| 7 | PMMA | NdFeB | FeAlSi | | | 0.45 |
| 8 | PMMA | NdFeB | Al | | | 0.22 |
| 9 | PMMA | SiO$_2$ | NdFeB | FeAlSi | | 1.59 |
| 10 | PMMA | SiO$_2$ | NdFeB | Al | | 0.73 |
| 11 | PMMA | SiO$_2$ | NdFeB | SiO$_2$ | FelAlSi | 1.93 |
| 12 | PMMA | SiO$_2$ | NdFeB | SiO$_2$ | Al | 1.11 |
| 13 | | NdFeB | FeAlSiNi | | | 0.57 |
| 14 | PMMA | PrFeP | FeAlSi | | | 0.42 |
| 15 | PMMA | PrFeP | Al | | | 0.21 |
| 16 | PMMA | CeFeAlC | FeAlSi | | | 0.39 |
| 17 | PMMA | CeFeAlC | Al | | | 0.19 |
| 18 | PMMA | NdPrFe | FeAlSi | | | 0.41 |
| 19 | PMMA | NdPrFe | Al | | | 0.20 |
| 20 | PMMA | NdFeSiCo | FeAlSi | | | 0.41 |
| 21 | PMMA | NdFeSiCo | Al | | | 0.19 |
| 22 | PMMA | SiO$_2$ | TbFe | FeAlSi | | 1.05 |
| 23 | PMMA | SiO$_2$ | TbFe | Al | 0.61 | |

Kerr rotation angle is measured using a helium-neon (HeNe) laser having a wave length of 632.8 nanometers.

Figure 16A:
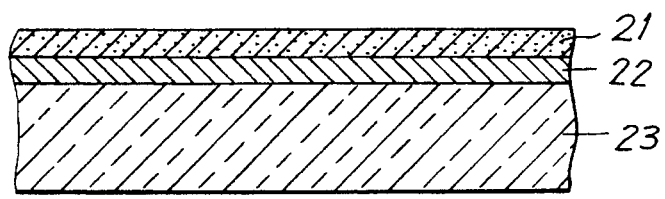

Configurations Nos. 1, 2 and 13–22 in Tables 6–11 and configuration Nos. 1, 2 and 13–21 in Tables 12 and 13 have the structure shown in FIG. 16(a). This structure comprises a glass substrate 23, a magneto-optic thin film recording layer 22 disposed on the glass substrate 23, and an aluminum layer or a low magnetic coercivity material layer 21 on the recording layer. All the layers are formed by sputtering. The magneto-optic thin film recording layer has a thickness of 500 Å and the low magnetic coercivity material layer or aluminum layer has a thickness of 1000 Å. When a low magnetic coercivity material layer is used, the Kerr rotation angle is nearly double the angle obtained when an aluminum layer is used.

Figure 16B:
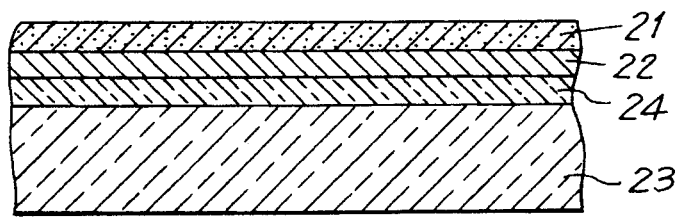

Configurations Nos. 3 and 4 in Tables 6–13 have the structure shown in FIG. 16(b). The structure comprises a glass substrate 23, a silicon dioxide transparent dielectric layer 24 formed by sputtering and having a thickness of about 800 Å disposed on the glass substrate, a magneto-optic thin film recording layer 22 formed by sputtering and having a thickness of about 500 Å disposed on the silicon dioxide transparent dielectric layer 24, and a low magnetic coercivity material layer or an aluminum layer 21 having a thickness of about 100 Å formed on the magneto-optic thin film recording layer. As can be seen from the Tables, when a low magnetic coercivity material layer is used, the Kerr rotation angle is nearly double the angle obtained when an aluminum layer is used.

Figure 16C:
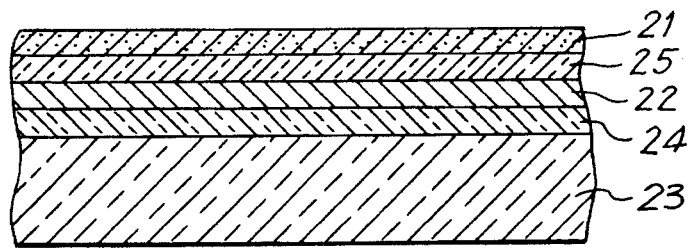

Configurations Nos. 5 and 6 in Tables 6–13 have the structure shown in FIG. 16(c). This structure comprises a glass substrate 26, a transparent dielectric layer 24 formed on the glass substrate, a magneto-optic thin film recording layer 22 formed on the transparent dielectric layer, an intermediate layer 25 formed on the magneto-optic thin film recording layer, and a low magnetic coercivity material layer or an aluminum layer 21 formed on the intermediate layer. The transparent dielectric layer 24 is a silicon dioxide film formed by sputtering and having a thickness of about 100 Å. As with the previous configurations, the Kerr rotation angle is considerably larger when the low magnetic coercivity material layer is used as compared to the case where an aluminum layer is used.

Figure 16D:
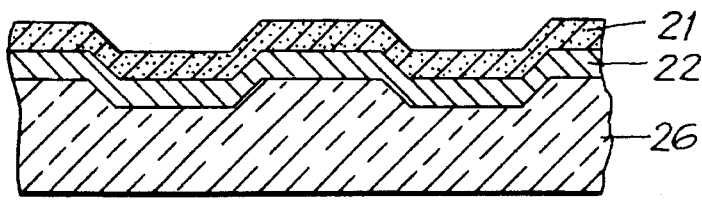

Configurations Nos. 7 and 8 in Tables 6–13 have the structure shown in FIG. 16(d). This structure comprises a substrate 26 formed of a polymethyl methacrylate disk (PMMA) provided with a guide groove having a width of 1.6 μm and a depth of 700 Å. A magneto-optic thin film recording layer 22 is provided on the substrate and a low magnetic coercivity material layer or an aluminum layer 21 is provided on the magneto-optic thin film recording layer. Again, the Kerr rotation angle is considerably larger when a low magnetic coercivity material layer is used as compared to when an aluminum layer is used.

Figure 16E:
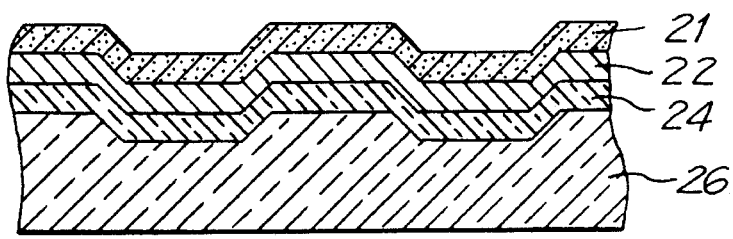

Configurations Nos. 9, 10, 23 and 24 in Tables 6–11 and configurations Nos. 9, 10, 22 and 23 in Tables 12 and 13 have the structure shown in FIG. 16(e). A substrate 26 which is a polymethyl methacrylate disk having a guide groove with a width of 1.6 μm and a depth of 700 Å is provided. A transparent dielectric layer 24 of silicon dioxide is provided on the PMMA layer, a magneto-optic thin film recording layer 22 is provided on the transparent dielectric layer, and a low magnetic coercivity material layer or an aluminum layer 21 is provided on the magneto-optic thin film recording layer. As can be seen from the Tables, the Kerr rotation angle is considerably larger when the structure includes a low magnetic coercivity material layer as compared to the case where an aluminum layer is used.

Figure 16F:
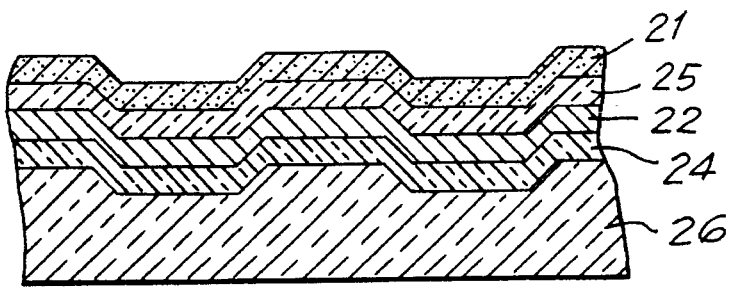

Configurations Nos. 11 and 12 in Tables 6–13 have the structure shown in FIG. 16(f). A substrate 26 comprising a PMMA disk provided with a guide groove having a width of 1.6 μm and a depth of 700 Å is provided. A transparent silicon dioxide dielectric layer 24 is disposed on the substrate, a magneto-optic thin film recording layer 22 is disposed on the transparent silicon dioxide dielectric layer, an intermediate layer 25 is disposed on the magneto-optic thin film recording layer, and a low magnetic coercivity material layer or an aluminum layer 21 is disposed on the intermediate layer. A large Kerr rotation angle is obtained when a low magnetic coercivity material layer is used as compared to when an aluminum layer is used.

In each of the Tables, the last two configurations show the use of a conventional magnetic terbium-iron thin film in a thin film recording system. The structure of the system is effective when a magneto-optic thin film recording layer is employed.

When Cr, Ni, Cu or Mn is added to the magneto-optic thin film recording layer, the same effect as that of configuration No. 21 in Tables 6–11 and configuration No. 20 in Tables 12 and 13 is obtained and excellent weatherability is observed. The resulting magneto-optic recording system has a magnetic easy axis perpendicular to the film surface. The presence of a cobalt series low magnetic coercivity material layer in the amorphous structure is explained by including a material selected from the group consisting of Ti, Zr, Ta and Nb in addition to the cobalt. This group is not considered to be limiting, and the same effect is observed when the material is selected from the group consisting of W, Hf, Y, Mo, B and Si. In order to provide a concrete example of amorphous low magnetic coercivity material layers, at least one of Si, B, and P was added to Fe. Additionally, Co and Ni were added to improve weatherability. Compositions using Cr, Mo and W were also prepared. In these configurations, the effects observed were the same as those previously observed for similar configurations.

As concrete examples of low magnetic coercivity material layers of FeNi series, CuMoFeNi, CuCrFeNi and MnNoFeNi thin films were prepared. The materials were not limited by the ones listed, and in the cases of using only FeNi, MoCrFeNi, MoCuCrVFeNi, VFeNi, WFeNi, CrFeNi, CuFeNi and MoFeNi, the Kerr rotation effect is the same as that previously obtained.

EXAMPLE 10

The relationship between Kerr rotation angle ($\theta_K$)(degrees) and magnetic coercivity force (Oersteds) was examined and the results are shown in FIG. 17. In FIG. 17 the abscissa of the graph is magnetic coercivity in Oersteds and the ordinate is Kerr rotation angle. The Examples employed have the structure shown in FIG. 16(a), wherein structure (a) of FIG. 17 comprises a glass substrate, an NdFeTi magnetic thin film disposed on the glass substrate, and a CoTi low magnetic coercivity material layer disposed on the magnetic thin film; structure (b) of FIG. 17 comprises a glass substrate, an NdFeTi magnetic thin film disposed on the glass substrate, and a CoZnNb low magnetic coercivity material layer disposed on the magnetic thin film layer; and, structure (c) of FIG. 17 comprises a glass substrate, a TbFe magnetic thin film disposed on the glass substrate and a CoTi low magnetic coercivity material layer disposed on the magnetic thin film layer. The Kerr rotation angle of structures (a), (b) and (c) of FIG. 17 increases in proportion to the decrease in magnetic coercivity of the low magnetic coercivity material layer. When magnetic coercivity equals about 100 Oersteds, Kerr rotation angle is equal to that of a structure having an aluminum reflective layer, as shown by curves d and e of FIG. 17.

When the magnetic coercivity is large, the Kerr rotation angle becomes smaller than the Kerr rotation angle achieved when an aluminum layer is used. This is due to the fact that the reflectance of the aluminum layer is smaller than that of the cobalt series alloy. As is shown in this Example, when a NdFeTi layer is used as a magneto-optic recording layer, a Co series amorphous alloy was employed as a low magnetic coercivity material layer. It is also possible to employ NdFeB as a magneto-optic recording layer, and Co series amorphous alloy, Fe series amorphous alloy, FeNi series permalloy alloy, sendust or super sendust alloy as a low magnetic coercivity material layer.

EXAMPLE 11

Frequency properties of a disk having the structure shown in FIG. 18(a) were examined using an optical head capable of magneto-optic recording and reproducing. A semiconductor laser having a wave length of 780 nm was used as a light source. The disk was rotated at a rate of 1800 rpm and a recording portion of the disk was fixed at a radius of 5 cm, thereby varying writing frequency. Reading and writing were done from the substrate side of the recording system. The substrate was a polycarbonate with a group. As can be seen in Table 14, thin films comprised of three layers were prepared.

TABLE 14

(unit of composition is atomic %)

| 1st Layer | 2nd Layer | 3rd Layer | Sample Number |
|---|---|---|---|
| PRIOR EXAMPLE | | | |
| AlN | $Tb_{24}Fe_{76}$ | Al | 1a |
| AlN | $Gd_{30}Co_{70}$ | Al | 2a |
| AlN | $Nd_{34}Fe_{61}Ti_5$ | Al | 3a |
| AlN | $Ce_{34}Fe_{61}Co_5$ | Al | 4a |
| AlN | $Pr_{10}Ce_{20}Fe_{65}Ti_5$ | Al | 5a |
| EMBODIMENT OF THIS INVENTION | | | |
| AlN | $Tb_{24}Fe_{76}$ | $Co_{80}Ti_{20}$ | 1b |
| AlN | $Gd_{30}Co_{70}$ | $Co_{80}Ti_{20}$ | 2b |
| AlN | $Nd_{34}Fe_{61}Ti_5$ | $Co_{80}Ti_{20}$ | 3b |
| AlN | $Ce_{34}Fe_{61}Co_5$ | $Co_{80}Ti_{20}$ | 4b |
| AlN | $Pr_{10}Ce_{20}Fe_{65}Ti_5$ | $Co_{80}Ti_{20}$ | 5b |

As can be seen in FIG. 18(a), an AlN (aluminum nitride) transparent dielectric layer 42 having a thickness of 800 Å was formed on a substrate 41 a magneto-optic recording layer 43 having a thickness of 1000 Å was formed on the transparent dielectric layer, and an aluminum reflective layer or a low magnetic coercivity material layer 44 of an amorphous Co series was formed on the magneto-optic recording layer. In this Example, a $Co_{80}Ti_{20}$ amorphous cobalt series layer having a film thickness of 500 Å was employed as a low magnetic coercivity material layer. The films were formed by direct current magnetron sputtering.

FIG. 18(b) shows C/N ratio (dB) as a function of recording frequency for each magneto-optic recording system shown in Table 15. In comparison with prior art systems in which an aluminum reflective layer is used, the C/N ratio increases with the presence of the amorphous cobalt series low magnetic coercivity material layer of the present invention. Furthermore, in a magneto-optic recording system in which at least one of Ce, Pr and Nd is included with Fe, recording frequency properties are improved and a superior effect is obtained.

The same experiment was performed using a system wherein the second layers of configurations Nos. 3(b) and 5(b) in Table 14 were $Nd_{34}Fe_{61}B_5$ and $Pr_{10}Ce_{20}Fe_{65}B_5$, respectively. The configurations used are shown in Table 15.

TABLE 15

(unit of composition is atomic %)

| 1st Layer | 2nd Layer | 3rd Layer | Sample Number |
|---|---|---|---|
| PRIOR EXAMPLE | | | |
| AlN | $Tb_{24}Fe_{76}$ | Al | 1a |
| AlN | $Gd_{30}Co_{70}$ | Al | 2a |
| AlN | $Nd_{34}Fe_{61}B_5$ | Al | 3a |
| AlN | $Ce_{34}Fe_{61}Co_5$ | Al | 4a |
| AlN | $Pr_{10}Ce_{20}Fe_{65}B_5$ | Al | 5a |
| EMBODIMENT OF THIS INVENTION | | | |
| AlN | $Tb_{24}Fe_{76}$ | $Co_{80}Ti_{20}$ | 1b |
| AlN | $Gd_{30}Co_{70}$ | $Co_{80}Ti_{20}$ | 2b |
| AlN | $Nd_{34}Fe_{61}B_5$ | $Co_{80}Ti_{20}$ | 3b |
| AlN | $Ce_{34}Fe_{61}Co_5$ | $Co_{80}Ti_{20}$ | 4b |
| AlN | $Pr_{10}Ce_{20}Fe_{65}B_5$ | $Co_{80}Ti_{20}$ | 5b |

The structure is illustrated in FIG. 19(a). The results of this experiment are illustrated graphically in FIG. 19(b). The effects observed were the same as those in the previous experiment, which were illustrated in FIG. 18.

In this case, $Co_{80}Ti_{20}$ was employed as a low magnetic coercivity material layer. When Fe series amorphous alloy, FeNi series permalloy sendust and super sendust alloys are employed, a similar improvement in C/N ratio is observed.

EXAMPLE 12

An optical disk comprising the multi-layers shown in FIG. 16(f), specifically, a substrate with a guide groove 26, a transparent dielectric layer disposed on the substrate 24, a magneto-optic recording layer 22 on the transparent dielectric layer, a silicon dioxide non-magnetic intermediate layer 25 on the magneto-optic recording layer, and a low magnetic coercivity material layer 21 on the intermediate layer was prepared. The thickness of the non-magnetic intermediate layer 25 was varied. The relationship between the thickness variation and the output power of a light source is shown in FIG. 20. The optical disk was composed of a low magnetic coercivity material layer 21 of CoTi having a thickness of 1000 Å, a magneto-optic recording layer 22 of NdFeHfCo having a thickness of 1000 Å, a silicon dioxide reflective layer having a thickness of 900 Å and a silicon dioxide non-magnetic intermediate layer 25 having a thickness which varied between 100 Å and 2000 Å.

FIG. 20 shows the variation of C/N ratio with laser power for various silicon dioxide non-magnetic intermediate layer thicknesses. Curve a shows a system having silicon dioxide non-magnetic intermediate layer thickness of 100 Å, curve b shows a system having silicon dioxide non-magnetic intermediate layer thickness of 200 Å, curve c shows a system having silicon dioxide non-magnetic intermediate layer thickness of 500 Å, curve d shows a system having silicon dioxide non-magnetic intermediate layer thickness of 1000 Å and curve e shows a system having silicon dioxide non-magnetic intermediate layer thickness of 2000 Å. As the silicon dioxide non-magnetic intermediate layer thickness increases, C/N becomes saturated at lower power. This means that recording sensitivity is improved. In the case where the silicon dioxide non-magnetic intermediate layer thickness is equal of 2000 Å, C/N ratio is saturated at a lower laser power and the saturation value of the C/N ratio is lower. As can be seen, the thickness of the non-magnetic intermediate layer should be equal to or less than that of the magneto-optic recording layer.

In this Example, NdFeHfCo was employed as the material of the magneto-optic recording layer. A similar experiment was performed using NdFeSiCo and similar results were obtained. CoTi in amorphous alloy form was used as the low magnetic coercivity material layer. When Fe series amorphous film, FeNi series permalloy, sendust or super-sendust were used, similar effects were obtained.

It will thus be seen that the objects set forth above, among those made apparent from the preceding description, are efficiently attained and, since certain changes may be made in the above constructions without departing from the spirit and scope of the invention, it is intended that all matter contained in the above description shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

What is claimed is:

1. A magneto-optic recording system including a thin film having the composition:

$$(Nd_{(1-x)}HR_x)_y TM_{(1-y)}$$

wherein:

TM is at least one transition metal element selected from the group consisting of iron, cobalt and nickel;

HR is at least one heavy rare earth element selected from the group consisting of dysprosium and terbium; and x is a fractional amount of heavy rare earth element in the LR-HR portion of the composition expressed as a decimal and is between about 0.1 to 0.5 and y is the fractional amount of rare earth element in the rare earth-TM portion of the composition expressed as a decimal and is between about 0.1 and 0.4.

2. The magneto-optic recording system of claim 1, wherein the transition metal is iron.

3. The magneto-optic recording system of claim 1, wherein the transition metal is iron and at least one of cobalt and nickel.

4. The magneto-optic recording system of claim 1, wherein the thin film has a magnetic coercivity greater than or equal to 100 oersted.

5. The magneto-optic recording system of claim 1, wherein y is about 0.25.

6. The magneto-optic recording system of claim 1, wherein y is between about 0.2 and 0.35.

7. The magneto-optic recording system of claim 1, wherein the thin film is prepared by sputtering.

8. The magneto-optic recording system of claim 1, wherein x is from 0.4 to 0.5, y is about 0.25 and TM is iron.

9. The magneto-optic recording system of claim 4, wherein the thin film is prepared by sputtering.

10. A magneto-optic recording system including a thin film having magneto-optic recording properties and having the composition:

$(Nd_{(1-x)}(PrHR)_x)_y TM_{(1-y)}$ in which HR is one of Dy and Tb, TM is at least one transition metal element selected from the group consisting of iron, cobalt and nickel and x is the fractional amount of heavy rare earth element component and is between about 0.1 and 0.5 and y is the fractional amount of rare earth element expressed as a decimal and is between about 0.1 and 0.4.

11. The magneto-optic recording system of claim 10, wherein TM is iron and cobalt.

12. A magnetic thin film having an easy axis of magnetization perpendicular to the plane of the film, having the composition:

$$(Nd_{1-x}Dy_x)_y TM_{(1-y)}$$

wherein:

TM is at least one transition metal element selected from the group consisting of iron, cobalt and nickel; and x is a fractional amount of Dy in the Nd-Dy portion of the composition expressed as a decimal and is between about 0.1 to 0.5 and y is the fractional amount of rare earth element in the rare earth-TM portion of the composition expressed as a decimal and is between about 0.1 and 0.4.

13. The magnetic thin film of claim 12, wherein TM is iron.

14. The magnetic thin film of claim 12, wherein the magnetic thin film has a magnetic coercivity greater than about 100 oersted.

15. The magnetic thin film of claim 12, wherein the magnetic thin film is prepared by sputtering.

16. The magnetic thin film of claim 13, wherein the magnetic thin film was prepared by sputtering.

17. A magneto-optic recording system including a thin film having the composition:

$$(Nd_{1-x}HR_x)_y TM_{1-y}$$

wherein:

TM is at least one transition metal element selected from the group consisting of iron and cobalt;

HR is at least one heavy rare earth metal, selected from the group consisting of dysprosium and terbium; and x is a fractional amount of heavy rare earth element in the Nd-HR portion of the composition expressed as a decimal and is between about 0.4 to 0.5 and y is the fractional amount of rare earth element in the rare earth-TM portion of the composition expressed as a decimal and is about 0.25.

18. The magneto-optic recording system of claim 17, wherein TM is Fe.

* * * * *